US009600953B2

(12) United States Patent
Stewart

(10) Patent No.: US 9,600,953 B2
(45) Date of Patent: *Mar. 21, 2017

(54) AUTHENTICATION APPARATUS AND METHOD

(71) Applicant: INNOVIA FILMS LIMITED, Wigton, Cumbria (GB)

(72) Inventor: Robert Stewart, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,316

(22) Filed: Mar. 25, 2016

(65) Prior Publication Data

US 2016/0210804 A1    Jul. 21, 2016

Related U.S. Application Data

(63) Continuation of application No. 14/433,506, filed as application No. PCT/EP2013/071435 on Oct. 14, 2013, now Pat. No. 9,336,641.

(30) Foreign Application Priority Data

Oct. 15, 2012    (GB) .................................. 1218463.6

(51) Int. Cl.
   *G06K 7/10*    (2006.01)
   *G07D 7/12*    (2016.01)
   *G06K 7/00*    (2006.01)

(52) U.S. Cl.
   CPC   *G07D 7/12* (2013.01); *G06K 7/00* (2013.01)

(58) Field of Classification Search
   CPC .......... G01J 1/42; G01J 4/00; G01J 2004/007; G02B 5/30; G02B 27/28; G06K 7/00;
   (Continued)

(56) References Cited

U.S. PATENT DOCUMENTS 3,480,785 A    11/1969    Aufderheide
5,896,192 A     4/1999    Nagase
(Continued)

FOREIGN PATENT DOCUMENTS

WO    2009/133390 A1    11/2009
WO    2010/001165 A1     1/2010
WO    WO-2010/001165 A1 *  1/2010    ............... G07D 7/16

OTHER PUBLICATIONS

International Search Report and the Written Opinion of the International Searching Authority of International application No. PCT/EP2013/071435, mailed Jan. 21, 2014, (10 pages).
(Continued)

*Primary Examiner* — Mark Beauchaine
(74) *Attorney, Agent, or Firm* — Ping Wang; Andrews Kurth Kenyon LLP

(57) ABSTRACT

An authentication apparatus operative to determine the authenticity of an item comprising a film substrate responsive to detection that a portion of said item located in a measuring region of said apparatus has a predetermined birefringence characteristic, said apparatus comprising: an item detection arrangement operative to determine if at least a portion of an item is located in a measuring region of said authentication apparatus; and an optically-based birefringence measuring apparatus, wherein said authentication apparatus is operative to compare a measured birefringence characteristic with a predetermined birefringence characteristic and to produce an authenticity signal indicative of authenticity or otherwise of said item based upon said comparison, said apparatus further comprising a control means operative to control output of said authenticity signal from said apparatus responsive to determination, by said item detection arrangement, of presence or otherwise of said at least a portion of said item in said measuring region.

20 Claims, 11 Drawing Sheets

(58) Field of Classification Search
CPC .. G06K 2007/10485; G07D 7/00; G07D 7/12; G07D 7/121
See application file for complete search history.

(56) References Cited

U.S. PATENT DOCUMENTS

| | | | |
|---|---|---|---|
| 5,960,103 | A | 9/1999 | Graves et al. |
| 6,155,605 | A | 12/2000 | Bratchley et al. |
| 9,336,641 | B2 * | 5/2016 | Stewart .................... G06K 7/00 |
| 2007/0029399 | A1 | 2/2007 | Schuster |
| 2009/0278307 | A1 | 11/2009 | Skinner et al. |
| 2010/0306532 | A1 | 12/2010 | Komatsu et al. |

OTHER PUBLICATIONS

File history of U.S. Appl. No. 14/433,506, filed Apr. 3, 2015.

* cited by examiner

BIREFRINGENCE DETECTOR

BIREFRINGENCE DETECTOR 2

BIREFRINGENCE DETECTOR 3

AUTHENTICATION APPARATUS AND METHOD

This application is a Continuation of U.S. application Ser. No. 14/433,506, filed Apr. 3, 2015, which is a national stage application of International Patent Application No. PCT/EP2013/071435, filed Oct. 14, 2013, which claims priority to Great Britain patent Application No. 1218463.6, filed Oct. 15, 2012. The entirety of the aforementioned applications is incorporated herein by reference.

FIELD

The present invention relates to an authentication apparatus and method, and particularly, but not exclusively, to an authentication apparatus for and method of authenticating an item comprising a polymer film.

BACKGROUND

Polymer films are increasingly being used as substrates in fields where security, authentication, identification and anti-counterfeiting are important. Polymer-based products in such areas include for example bank notes, important documents (e.g. ID materials such as for example passports and land title, share and educational certificates), films for packaging high-value goods for anti-counterfeiting purposes, and security cards.

Polymer-based secure materials have advantages in terms of security, functionality, durability, cost-effectiveness, cleanliness, processability and environmental considerations. Perhaps the most notable amongst these is the security advantage. Paper-based bank notes, for example, can be relatively easy to copy, and there is lower occurrence of counterfeits in countries with polymer-based bank notes compared to paper-based bank notes. Polymer-based bank notes are also longer-lasting and less-easily torn.

Security materials based on polymer films are amenable to the incorporation of a variety of visible and hidden security features. Since the introduction of the first polymer bank notes approximately 25 years ago, security features have included optically variable devices (OVD), opacification features, printed security features security threads, embossings, transparent windows and diffraction gratings. Aside from complicated security features there is also the more immediate advantage that the high temperatures used in copying machines will often cause melting or distortion of polymer base-material if counterfeiters attempt simply to copy secure materials (e.g. bank notes) using such machines.

However, standalone apparatus suitable for the authentication of security documents at points of sale is only in limited use at the present time. Points of sale may have a UV light source for detecting a fluorescent ink on a bank note, or a pen which does not mark authentic bank notes. These devices do not provide a high technical hurdle to counterfeiters. Points of sale may also have electronic apparatus which authenticates a credit or debit card using a tamper-resistant electronic circuit embedded in the card. However, this apparatus is complex and expensive, requires time to process and a telecommunications link to a remote server, and is not suitable for use in the authentication of bank notes during routine cash transactions.

More sophisticated apparatus for checking the authenticity of bank notes is in common use by credit institutions and professional cash handlers for checking bank notes which are to be returned to circulation, but such apparatus is expensive, particularly as it is generally necessary to check for the presence of multiple security features to authenticate a bank note. Cash receiving machines have less sophisticated authentication apparatus as they have to be kept to a relatively low cost.

BRIEF DESCRIPTION OF THE DRAWINGS

FIG. 9c illustrates a graph of an output signal response of birefringence measuring apparatus of the authentication apparatus of FIG. 9a.

DETAILED DESCRIPTION

Figure 1:
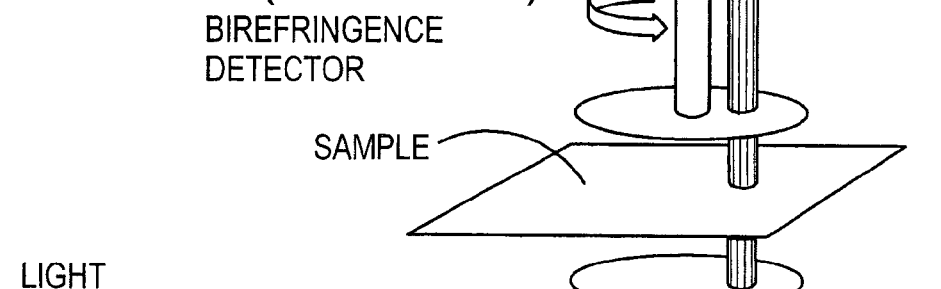
FIGS. 1 to 3 schematically illustrate components of known apparatus for implementing different methods of observing birefringence.

A variety of polymers may be used as secure substrates. Amongst these is polypropylene film. The three main methods of manufacturing polypropylene film are the stenter method, the cast method and the bubble method.

In the cast and stenter methods, polymer chips are typically placed in an extruder and heated so that an extrudate is forced out of a slit die onto a chilled roller to form a film (in the case of the cast method) or a thick polymer ribbon (in the case of the stenter method). In the stenter method, the thick polymer ribbon is then reheated and then stretched lengthways (termed the "machine direction") and widthways (termed the "transverse direction") to form a film.

In the bubble method, the polymer is extruded not through a slit die but through an annular die, to form a relatively thick extrudate, in the form of a hollow cylinder or "drainpipe" shape through which air is blown. The annular die is at the top of an apparatus which is typically the equivalent of several storeys high (for example 40 to 50 meters). The extrudate moves downwards and is heated sequentially so that it is expanded to form a bubble. The bubble is then slit into two half-bubbles, each of which may be used individually as "monoweb" films; or alternatively the two halves may be nipped and laminated together to form a double thickness film (or the bubble may be collapsed to form a double thickness film). Typically there are three concentric annuli at the die, so that the hollow cylinder is an extrudate of three layers. For example, there may be a core layer of polypropylene with a terpolymer skin layer on one side and another terpolymer skin layer on the other side. In this case the monoweb would consist of three layers with polypropylene in the middle and the double web would consist of five layers because the layer in the middle would be the same skin layer (terpolymer) of each half-bubble. Many other possible arrangements and components are possible, for example in terms of the number of annuli, type of skin layer, type of core layer, etc.

Thus the bubble method results in a thin film (for example 10 to 100 microns thick) by forming a bubble whereas the stenter method results in a thin film by stretching the material. The bubble method results in homogeneously stretched film which is different to and for some purposes advantageous over stenter film. Biaxially Oriented Polypropylene (BOPP) film is made by the bubble process by Innovia Films Ltd., Wigton, UK. In addition to polypropylene, other polymers (e.g. LLDPE, polypropylene/butylene copolymers) may also be formed as thin films using the bubble process.

Previous authentication apparatus and methods make use of known sheets of security document substrate which are permeable to electromagnetic radiation, for example, transparent in the visible region of the electromagnetic spectrum. It is known to create security documents, such as banknotes, by printing opaque inks onto sheets of transparent plastics substrate material, leaving a transparent window. The resulting window provides an overt security feature which is conspicuous to the human eye. It is known to print, etch or embed additional optical security features, such as optically variable devices formed by diffraction gratings, onto or into the resulting transparent windows, to provide additional overt security features. It is known to provide automatic authentication apparatus which can determine authenticity from the presence or absence of these additional optical security features, but such apparatus is typically complex and expensive.

WO 2009/133390 discloses a method of authenticating a polymer film comprising measuring the birefringence of a core layer therein.

Birefringence, or double refraction, is a property of materials caused by differences in the refractive indices of the material for the two different polarisations, s– and p–, and between the two axes of its surface place.

A birefringent material, when presented with polarised light, splits the light into ordinary and extraordinary rays which are both retarded by transmission through the birefringent material, but to different degrees. After transmission through a second polariser at 90° with respect to the polarised light, the two rays recombine and interfere with one another destructively or constructively. The effect generated is of variable transmission in the form of a sine wave as the birefringent material is rotated from the minima (0° with respect to the polarisers) to the maxima (45° with respect to the polarisers).

Birefringence is induced in transparent polymer films in three ways: crystal orientation, polymer chain orientation and crystal lattice deformation.

Refractive index is proportional to the density of a material; polymeric materials exist in two forms, crystalline and amorphous, both of which exist in a known proportion within a particular polymer type—polypropylene can be between 35% and 50% crystalline depending on its molecular weight range and its stereo-chemistry. During the bubble process crystallisation occurs as the molten cast tube (1 mm thick) is quenched using chilled water; cooling is rapid and temperature gradients occur across the thickness of the film giving some directionality to crystallisation. Crystalline areas form throughout the cast tubes that are then pulled during the stretching process into their final shape within the finished polymer. Birefringence is caused by differences in the lengths of the various dimensions of the crystalline regions and their orientation within the polymer; as the bubble polymer is stretched equally in both machine and transverse directions, this is expected to average out producing a low birefringence; however uneven distribution of crystalline areas causes variance of birefringence over distances of 1-3 mm.

Refractive index is also affected by the orientation of the polymer chains within the material; this has the largest effect on the overall birefringence which is proportional to the ratio between the machine direction and transverse direction stresses during stretching.

Finally, lattice deformation is theoretically a cause of birefringence but is unlikely to be significant in a soft, low melting point material such as polypropylene.

The resulting effect of the birefringence of a material manifests itself as a rotation of the polarisation angle of light being transmitted through the material; the effect is initiated via an interfacial interaction and propagated through the birefringent material; the degree of birefringence observed is a product of the initial interfacial interaction (i.e. the angle of incidence) and the subsequent path length through the material.

As noted above, the birefringent effect is a product of the thickness of the film and the degree to which the refractive indices differ between the two axes. The effect is visible if the film is placed between two crossed polarisers and rotated through 90° between a minima (equivalent to no change in transmission from the crossed polarisers) to a maxima at 45° where potentially as much light is transmitted as would be through a single polariser.

Birefringence in films is induced by orientation differences in production between the machine and the transverse direction; the resulting films have two axes at 90° to one another at which points the birefringence is at its minimum value, with 45° from either axis being the maximum. As a result of the nature of film processing in reels and sheets, every material produced by every known process will have the same properties including the polarisers.

Because of the universality of the orientation of polymers, a single measurement of birefringence at 45° is sufficient to determine the maximum value of any film and any printed product from that film. The polarisers themselves will also conform to this; therefore in the manufacture of a device such as this the specification for the polarisers should be that they should be cut at 45° from a master polariser sheet.

The method and apparatus disclosed in WO 2009/133390 involves the use of a pair of spinning polarisers that are at oriented at 90° to one another. The polarisers are operative to rotate at the same rate, and the apparatus is operative to measure the intensity of the light that passes through a sample placed between the polarisers.

Figure 2:
Figure 3:
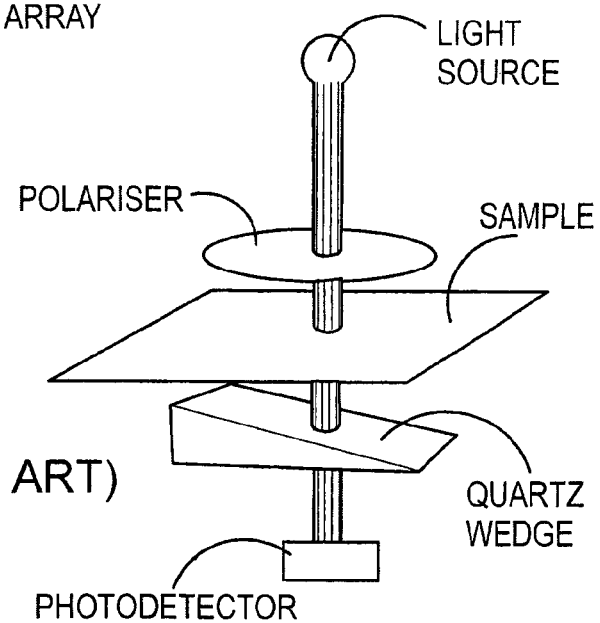

FIGS. 1 to 3 show components of apparatus for different methods of observing birefringence as disclosed in WO 2009/133390.

With reference to FIG. 1, a first method of observing birefringence is via the use of crossed polarisers. Linear polarisers allow one type of either s– or p– polarised light to pass through them, so that when a second linear polariser is presented and twisted 90° relative to the first, the remaining light made from a single polarised type is filtered out; this technique is referred to as using cross polarisers. Birefringent materials effectively rotate the axis of polarisation and so, when placed between two crossed polarisers will affect how much light is permitted to pass through them. Rotating the birefringent material whilst between the crossed polarisers causes the intensity of light to vary as the angles of birefringence alters. Thin polymer films operate on the first order of birefringence and will tend to rotate light between 0° and 90°; a fully birefringent material will vary from no enhancement in transmission between the polarisers to eliminating the effect of the first polariser by rotating light to pass through the second. This behaviour forms the basis of one method of measuring the birefringence of the films; the sample is typically placed between two motorised cross polarising filters which then rotate through 360° whilst maintaining the same rotationary configuration with respect to one another, light passes from a source through the filter/sample/filter and its intensity is measured using a photodiode. The intensity measured will follow two 180° cycles the maximum and minimum values of which will be related to the birefringence of that film.

With reference to FIG. 2, a second method for the measurement of birefringence is to use two circular-shaped linear polarising filters that are composed of sectors of material, each having its own polarisation angle which is related to the angular position of the sector on the circular optic. If two of these optics are differentiated by their s– and p– orientations, then the combination of both will act as cross polarisers for each sector. A single light source can be used to illuminate a sample placed between two such polarisers and the transmitted light from each sector can be fed into an optical fibre which in turn has the intensity transmitted measured using a photodiode. In this way, the birefringent behaviour of the film can be measured in a single measurement without rotating the polarisers—the resolution of such a measurement will depend on the angular size of each of the sectors—for example sectors as large as 20° would give eighteen measurements and would be more than sufficient for the finding of the maximal and the minimal transmissivities.

With reference to FIG. 3, a third method for the measurement of the birefringence is the use of a quartz wedge. In this instance, the birefringent material is placed between a polarising filter and a calibrated quartz wedge whilst light is shone through towards an inspection system that measures the positions of fringes on the wedge.

To differentiate between the designated genuine film and others, the above-described birefringence measurement method may be employed to allow the user to eliminate other types of film, i.e. designated counterfeit films: BOPP film made by the stenter process is oriented more in the transverse direction than the machine direction, and so is considerably more birefringent than BOPP films made by the double bubble process. Birefringence can be controlled precisely using the double bubble process and so can provide a unique signature that can eliminate films.

The method of WO 2009/133390 allows a film to be securitized as is. The particular inherent characteristics of the film are observed using the disclosed method, and there is no need to add any further security or identifying features. This identification allows authentication for security purposes and also allows the film's origin to be determined.

The films referred to herein are generally sheet-form materials, and may be provided as individual sheets, or as a web material which may subsequently be processed (by die cutting for example) to provide sheet or article form materials. When referring to "film" in this specification it is intended, unless expressly provided otherwise, to include films in sheet, article or in web form.

The method of WO 2009/133390 is suitable for authenticating items containing films made by the bubble process. The bubble process results in films which have balanced orientation, well-defined and uniform thicknesses and other properties (high tensile strength, low elongation, high gloss and clarity, good puncture and flex-crack resistance, resistance to oils and greases, good water-impermeability) which define a "signature" of the film which indicate that it has been prepared by the bubble process.

In order to differentiate between films (e.g. BOPP films and others) the overall thickness of the film, as well as the thickness of individual layers, for example a laminating layer, may be measured. This allows determination of particular characteristics which are dependent on particular processes, for example a particular bubble process. Additionally, or alternatively, the unique birefringent signature of the film may be assessed and used to determine whether the film was made by a particular process and accordingly whether it is, for example, a genuine bank note or counterfeit. Birefringence depends on the anisotropy of the material and films made by bubble process have different anisotropies and hence different birefringent properties to films made by other processes. Furthermore the precise conditions used in the bubble process will affect the birefringent signature.

Thus WO 2009/133390 recognises that, rather than needing to add security or identification features, the inherent properties of films made by particular processes, such as the bubble process, are unique and act as a signature.

Actual counterfeit film is more likely to be bought rather than made by the counterfeiter. There are several sources that can be broken into three main groupings:

1. Cast or blown films—cast films are made by extruding polymer through a die onto a chilled roller. Blown films are made by extruding a polymer through a circular die and inflating a bubble in the semi-molten state. Cast films & blown films are typically either non or slightly oriented and so have inferior dimensional stability (i.e. they can easily be stretched), poorer optics and thickness control.

2. Mono oriented films—mono oriented films are made by extruding through a die and stretching in the machine direction. Mono oriented films are highly oriented, they have poorer optics and poor transverse direction dimensional stability.

3. Biaxially oriented films—biaxially oriented films are commercially available from Innovia Films Limited and from a number of other suppliers. Commercial grades of BOPP from many suppliers are generally made by the stenter process where PP is extruded through a slot die onto a chill roller, stretched in the machine direction over heated rollers and stretched in the transverse direction in a tenter frame. These films are anisotropic in nature unlike BOPP made by the double bubble process, which is stretch oriented evenly in all directions.

There exists the possibility that a counterfeiter may be aware of the above-described birefringence effect. In order to deceive systems employing the above-described method, the counterfeiter may produce counterfeit items by printing on film at 45° to the film's sheet edge or reel edge. Whilst the difficulty of doing this may effectively rule out any industrial process, the danger might remain for a knowledgeable and determined counterfeiter.

The above described birefringence measurement methods may require a relatively lengthy amount of time to make appropriate measurements. In practice this may be greater than one second, thereby effectively ruling out high speed measurements. Also, there is the issue of item placement and measurement area. Transparent or "window" regions of items may be small and partially covered with print. Thus, in the particular field of banknote authentication, an automatic alignment to a particular denomination may be possible, but this might become awkward in manual use. This is further complicated by the size of the measurement area: large areas can be more accurate but will be more likely to accidentally incorporate some of the printed areas of the window.

The above described birefringence measuring method may be useful for authenticating films which form part of security documents. However, in some instances, those security documents may comprise film substrates where at least a portion of the film substrate is printed upon. To ensure that a correct birefringence measurement for the film substrate itself is taken, the measurement should be made on the unprinted or "window" region of the film, i.e. an item authentication region of the item. A birefringence measurement performed on a printed area of the film substrate may result in a "false positive", because the birefringence measurement reading for the printed region may be of a similar level to that of a genuine film. Therefore, it is important that the birefringence measurement is performed on the unprinted or "window" region (i.e. directly on the film substrate) of the item rather than on a printed region to avoid such "false positives" and to obtain an accurate birefringence measurement of the film substrate. A non-window area could be mistaken for an area of low birefringence or air when placed between two polarisers, because in both situations transmission is low between the crossed-polarisers.

As may be appreciated, the need to ensure that it is the window region (or item authentication region) of the item upon which birefringence measurement is performed, rather than on a printed region, may require some manipulation of the item on the part of a user. The user may need to move the item within the measuring apparatus until the window region of the item is located in a measuring region where the birefringence measurement method can be performed. This may prove time consuming whilst the user manipulates the item to properly locate the window in the measuring region.

It may be desirable to implement a birefringence measurement method for the authentication of items using machine feeding apparatus. This may potentially increase the speed at which items can be authenticated.

The present invention has been devised with the foregoing considerations in mind.

According to an aspect of the present invention, there is provided an authentication apparatus operative to determine the authenticity of an item comprising a film substrate responsive to detection that a portion of the item located in a measuring region of the apparatus has a predetermined birefringence characteristic, the apparatus comprising: an item detection arrangement operative to determine if at least a portion of an item is located in a measuring region of the authentication apparatus; and an optically-based birefringence measuring apparatus, wherein the authentication apparatus is operative to compare a measured birefringence characteristic with a predetermined birefringence characteristic and to produce an authenticity signal indicative of authenticity or otherwise of the item based upon the comparison, the apparatus further comprising a control means operative to control output of the authenticity signal from the apparatus responsive to determination, by the item detection arrangement, of presence or otherwise of the at least a portion of the item in the measuring region.

This may allow the apparatus to output an authenticity signal only when a portion of an authentic or genuine item is located in the measuring region. The operation of the item detector arrangement may serve to reduce power consumption of the apparatus: the authenticity signal may be output by the apparatus only when an item is present. Otherwise, no signal is output.

Optionally, the item detection arrangement may comprise an item detection emitter located, and operative, to illuminate with electromagnetic radiation an item detection region of the apparatus, and an item detection detector, located, and operative, to receive at least one of: electromagnetic radiation reflected from the item detection region; and electromagnetic radiation transmitted through the item detection region, wherein the item detection detector is further operative to provide a signal indicative of presence or otherwise of an item in the item detection region, and further wherein the item detection arrangement is operative to determine that the at least a portion of the item is located in the measuring region responsive to receipt of the item detection detector signal indicating presence of an item in the item detection region.

The item detection emitter may be operative to emit white-light and/or infra-red light, and the item detection detector may be operative to detect white-light and/or infrared light.

Further optionally, the apparatus may be operative to differentiate between item film substrates made by a bubble process and item film substrates made by a different process.

The optically-based birefringence measuring apparatus may comprise a birefringence measurement emitter located, and operative, to illuminate the measuring region of the apparatus with electromagnetic radiation; a first polariser located between the birefringence measurement emitter and a first side of the measuring region so that electromagnetic radiation emitted by the birefringence measurement emitter passes therethrough; a birefringence measurement detector located on a second side of the measuring region, and operative to receive electromagnetic radiation transmitted through the measuring region from the birefringence measurement emitter; and a second polariser located between the second side of the measuring region and the birefringence measurement detector so that electromagnetic radiation transmitted through the measuring region passes therethrough, the second polariser oriented so as to effect polarisation in a direction transverse to that of the first polariser; wherein the birefringence measurement detector is operative to output a signal corresponding to a measured birefringence characteristic.

The output signal output by the birefringence measurement detector corresponding to a measured birefringence characteristic may be proportional to an intensity of transmitted electromagnetic radiation received.

Optionally, the birefringence measurement detector may be operative to communicate the output signal corresponding to a measured birefringence characteristic to a processor which is operative to compare a value of the output signal with the predetermined birefringence characteristic.

Further optionally, the predetermined birefringence characteristic may comprise one of: a first range of values corresponding to expected birefringence measurement detector output signal values if an opaque or semi-opaque region of the item is located in the measuring region; a second range of values corresponding to expected birefringence measurement detector output signal values if a transparent or semi-transparent region of the item is located in the measuring region; and a third range of values corresponding to expected birefringence measurement detector output signal values if no item is present in the measuring region.

The birefringence measurement emitter may comprise a light source. Optionally, the light source may comprise a white light emitting LED.

The birefringence measurement detector may comprise a photodetector. Optionally, the photodetector may comprise a photodiode. Further optionally, the photodiode may be suitable for detecting white light.

The birefringence measurement emitter may be slidably mounted on a rail or rod. Optionally, the birefringence measurement emitter may be attached to the rail or rod by an attachment which is slidable relative to the rail or rod, and which attachment may comprise a fixing element (e.g. a locking screw) to allow a position of the birefringence measurement emitter to be fixed relative to the rail or rod.

The birefringence measurement detector may be slidably mounted on a rail or rod. Optionally, the birefringence measurement detector may be attached to the rail or rod by an attachment which is slidable relative to the rail or rod, and which attachment may comprise a fixing element (e.g. a locking screw) to allow a position of the birefringence measurement detector to be fixed relative to the rail or rod.

Optionally, the item detection arrangement may comprise an optically-based reflectance measuring apparatus for determining if an item authentication region is located in the measuring region, wherein the reflectance measuring apparatus may comprise: a reflectance measurement emitter operative to illuminate the measuring region of the apparatus with electromagnetic radiation; and a reflectance measurement detector located and operative to receive electromagnetic radiation reflected from the measuring region of the apparatus and operative to output a signal corresponding to a measured characteristic of the electromagnetic radiation reflected from the measuring region and indicative of presence or otherwise of an item authentication region in the measuring region, wherein the reflectance measuring apparatus is operative to compare a measured reflection characteristic with a set of predetermined reflection characteristics and to determine presence or otherwise of the item authentication region in the measuring region based upon the comparison, and further operative to provide to the control means a signal indicative of the determination for controlling output of the authenticity signal from the control means.

This may allow the apparatus to output an authenticity signal only when an item authentication region of an item is located in the measuring region. At all other times, another signal type may be output by the apparatus. For example, the signal may comprise a signal indicating that no sample is present or, for example, a signal indicating that the region of the item which is located in the measuring region is not the authentication region (e.g. a non-window region or printed region of the item)).

Optionally, the output signal output by the reflectance measurement detector corresponding to a measured reflection characteristic may be proportional to an intensity of reflected electromagnetic radiation received.

Optionally, the reflectance measurement detector may be operative to communicate the output signal corresponding to a measured reflection characteristic to a processor which is operative to compare a value of the output signal corresponding to the measured reflection characteristic with the predetermined reflection characteristic, which may comprise a pre-defined value indicative of presence of an item authentication region of the item in the measuring region, and the processor operative to implement the determination that the item authentic region is present or absent in the measuring region based upon the comparison and operative to provide to the control means the signal indicative of the determination.

Optionally, if the comparison of the predetermined reflection characteristic with the output signal output by the reflectance measurement detector corresponding to a measured reflection characteristic indicates that the item authentication region is located in the measuring region, the processor is operative to output a determination signal to the control means indicative of presence of the item authentication region in the measuring region, wherein responsive to receipt thereof, the control means is operative to output the authenticity signal indicative of authenticity or otherwise of the item based upon the comparison of the predetermined birefringence characteristic with the output signal output by the birefringence measurement detector corresponding to a measured birefringence characteristic.

Optionally, the predetermined reflection characteristic may comprise one or more of: a first range of values corresponding to expected reflectance measurement detector output signal values if an opaque or semi-opaque region of the item is located in the measuring region; a second range of values corresponding to expected reflectance measurement detector output signal values if a transparent or semi-transparent region of the item is located in the measuring region; and a third range of values corresponding to expected reflectance measurement detector output signal values if no item is present in the measuring region.

Optionally, the reflectance measurement detector may have associated therewith a shade, the shade including at least one aperture, wherein the aperture may be located with respect to the reflectance measurement detector to permit electromagnetic radiation reflected from the at least a portion of the item to be received by the reflectance measurement detector.

Optionally, the shade may comprise a tube, and in which the aperture may comprise the hollow portion of the tube. Further optionally, the aperture may comprise a tubular region in the shade. The reflectance measurement detector may be located at an end of the tube, or within the tube, or at an end of, or within, the tubular region of the shade.

Optionally, the reflectance measurement emitter has associated therewith a shade, the shade including an aperture, wherein the aperture is located with respect to the reflectance measurement emitter to permit electromagnetic radiation emitted from the reflectance measurement d emitter to be directed toward the measuring region of the apparatus.

Optionally, the shade may comprise a tube, and in which the aperture may comprise the hollow portion of the tube. Further optionally, the aperture may comprise a tubular region in the shade. The reflectance measurement emitter may be located at an end of the tube, or within the tube, or at an end of, or within, the tubular region of the shade.

Optionally, the reflectance measurement emitter is operative to emit coherent electromagnetic radiation. Further optionally, the reflectance measurement emitter may comprise at least one LED. The at least one LED may be operative to emit light in the infra-red range of the electromagnetic spectrum and/or may comprise a white light emitter source. Yet further optionally, the reflectance measurement emitter may comprise at least one strip electromagnetic radiation source.

Optionally, the reflectance measurement detector may comprise at least one photodiode. Further optionally, the at least one photodiode may be operative to detect light in the infra-red range of the electromagnetic spectrum. Yet further optionally, the reflectance measurement detector may comprise at least one line-scan camera and/or may comprise at least one spectrometer and a CCD or CMOS image sensor.

Optionally, the reflectance measurement emitter may comprise at least one of: a plurality of LEDs; a plurality of white light emitter sources; and a plurality of strip electromagnetic radiation sources; and the reflectance measurement detector may comprise at least one of: a plurality of photodiodes; a plurality of line-scan cameras; and a plurality of spectrometers and CCD or CMOS image sensors; wherein each one of the plurality of LEDs is paired with a corresponding one of the plurality of photodiodes and/or plurality of line-scan cameras and/or plurality of spectrometers and CCD or CMOS image sensors, wherein each one of the plurality of white light emitter sources may be paired with a corresponding one of the plurality of photodiodes and/or plurality of line-scan cameras and/or plurality of spectrometers and CCD or CMOS image sensors, and wherein each one of the plurality of strip electromagnetic radiation sources may be paired with a corresponding one of the plurality of photodiodes and/or plurality of line-scan cameras and/or plurality of spectrometers and CCD or CMOS image sensors.

Optionally, at least one of the plurality of LEDs may be operative to emit light in the infra-red range of the electromagnetic spectrum. Further optionally, at least one of the plurality of photodiodes may be operative to detect light in the infra-red range of the electromagnetic spectrum.

The apparatus optionally may include a transport path, of which a part may comprise the measuring region, and along which item transport path the item may be conveyable.

The item may comprise a banknote.

The opaque or semi-opaque region may comprise a printed region of the banknote and/or the transparent or semi-transparent region of the item may comprise an unprinted or window region (item authentication region) of the banknote.

According to another aspect of the present invention, there is provided a banknote counting apparatus comprising the authentication apparatus which includes any one or more of the above-described features, the banknote counting apparatus further comprising a note counting device operative to maintain a count of banknotes conveyed through the apparatus, and the note counting device further operative to receive the authenticity signal indicative of authenticity or otherwise of the item from the authentication apparatus, wherein the note counting device is operative to alter a note count only when the signal indicates that an item in the measuring region is authentic.

Optionally, upon receipt of the signal indicating that the item in the measuring region is authentic, the note counting device may be operative to alter the note count. Further optionally, the note counting device may be operative to alter the note count by incrementing the count.

According to another aspect of the present invention, there is provided a method of authenticating an item comprising a film substrate, the method comprising detecting if a portion of an item located in a measuring region of an authentication apparatus has a predetermined birefringence characteristic, and further comprising the steps of: determining, by an item detection arrangement, if at least a portion of an item is located in a measuring region of the authentication apparatus; comparing a measured birefringence characteristic, obtained by an optically-based birefringence measuring apparatus, with a predetermined birefringence characteristic; producing an authenticity signal indicative of authenticity or otherwise of the item based upon the comparison; controlling, by way of a control means, output of the authenticity signal from the apparatus responsive to determination, by the item detection arrangement, of presence or otherwise of the at least a portion of the item in the measuring region.

Optionally, the method may comprise illuminating with electromagnetic radiation, by way of an item detection emitter forming part of the item detection arrangement, an item detection region of the apparatus, and receiving, by way of an item detection detector forming part of the item detection arrangement, at least one of: electromagnetic radiation reflected from the item detection region; and electromagnetic radiation transmitted through the item detection region, and further comprising providing a signal indicative of presence or otherwise of an item in the item detection region and, responsive to receipt of an item detection detector signal indicating presence of an item in the item detection region, determining, by the item detector arrangement, that the at least a portion of the item is located in the measuring region.

Optionally, the method may differentiate between item film substrates made by a bubble process and item film substrates made by a different process.

Optionally, the method may comprise illuminating, with a birefringence measurement emitter, the measuring region of the apparatus with electromagnetic radiation; locating a first polariser between the birefringence measurement emitter and a first side of the measuring region so that electromagnetic radiation emitted by the birefringence measurement emitter passes therethrough; locating a birefringence measurement detector on a second side of the measuring region; receiving, at the birefringence measurement detector, electromagnetic radiation transmitted through the measuring region from the birefringence measurement emitter; locating a second polariser between the second side of the measuring region and the birefringence measurement detector so that electromagnetic radiation transmitted through the measuring region passes therethrough; orienting the second polariser so as to effect polarisation in a direction transverse to that of the first polariser; outputting, from the birefringence measurement detector, a signal corresponding to a measured birefringence characteristic.

Optionally, the method may comprise communicating the output signal corresponding to a measured birefringence characteristic to a processor; and comparing, in the processor, a value of the output signal with the predetermined birefringence characteristic.

Optionally, the predetermined birefringence characteristic may comprise one of: a first range of values corresponding to expected birefringence measurement detector output signal values if an opaque or semi-opaque region of the item is located in the measuring region; a second range of values corresponding to expected birefringence measurement detector output signal values if a transparent or semi-transparent region of the item is located in the measuring region; and a third range of values corresponding to expected birefringence measurement detector output signal values if no item is present in the measuring region.

Optionally, the method may comprise: determining, by way on an optically-based reflectance measuring apparatus of the item detection arrangement, if an item authentication region of an item is located in the measuring region, the determining step implemented by: illuminating, by way of a reflectance measurement emitter of the reflectance measuring apparatus, the measuring region of the apparatus with electromagnetic radiation; receiving, by way of a reflectance measurement detector of the reflectance measuring apparatus, electromagnetic radiation reflected from the measuring region of the apparatus; outputting, from the reflectance measurement detector, a signal corresponding to a measured characteristic of the electromagnetic radiation reflected from the measuring region and indicative of presence or otherwise of an item authentication region in the measuring region; comparing, in the reflectance measuring apparatus, a measured reflection characteristic with a set of predetermined reflection characteristics; and determining presence or otherwise of the item authentication region in the measuring region based upon the comparison; and providing, to the control means, a signal indicative of the determination for controlling output of the authenticity signal from the control means.

Optionally, the method may comprise communicating the output signal corresponding to a measured reflection characteristic to a processor which is operative to compare a value of the output signal corresponding to the measured reflection characteristic with the predetermined reflection characteristic, which may comprise a pre-defined value indicative of presence of an item authentication region of the item in the measuring region, and the processor operative to implement the determination that the item authentication region is present or absent in the measuring region based upon the comparison and operative to provide to the control means the signal indicative of the determination.

Optionally, if the comparison of the predetermined reflection characteristic with the output signal output by the reflectance measurement detector corresponding to a measured reflection characteristic indicates that the item authentication region is located in the measuring region, outputting, from the processor to the control means, a determination signal indicative of presence of the item authentication region in the measuring region, wherein responsive to receipt thereof, outputting, from the control means, the authenticity signal indicative of authenticity or otherwise of the item based upon the comparison of the predetermined birefringence characteristic with the output signal output by the birefringence measurement detector corresponding to a measured birefringence characteristic.

The predetermined reflection characteristic may comprise one or more of: a first range of values corresponding to expected reflectance measurement detector output signal values if an opaque or semi-opaque region of the item is located in the measuring region; a second range of values corresponding to expected reflectance measurement detector output signal values if a transparent or semi-transparent region of the item is located in the measuring region; and a third range of values corresponding to expected reflectance measurement detector output signal values if no item is present in the measuring region.

The opaque or semi-opaque region may comprise a printed region of a banknote and/or the transparent or semi-transparent region of the item may comprise an unprinted or window region (item authentication region) of the banknote.

Optionally, the method may comprise providing a transport path in the authentication apparatus, of which a part of the transport path may comprise the measuring region, and conveying the item along the transport path.

According to another aspect of the present invention, there is provided a banknote counting method comprising any one or more of the method steps described above, the banknote counting method further comprising maintaining, using a note counting device, a count of banknotes conveyed through the apparatus; receiving, at the note counting device, from the authentication apparatus, the authenticity signal indicative of authenticity or otherwise of the item; and altering a note count only when the authenticity signal indicates that an item in the measuring region is authentic.

Optionally, the method may further comprise altering the note count upon receipt of an authenticity signal indicating that an item in the measuring region is authentic. Further optionally, the method may comprise altering the note count by incrementing the count.

One or more specific embodiments in accordance with aspects of the present invention will be described, by way of example only, and with reference to the following drawings.

Figure 4:
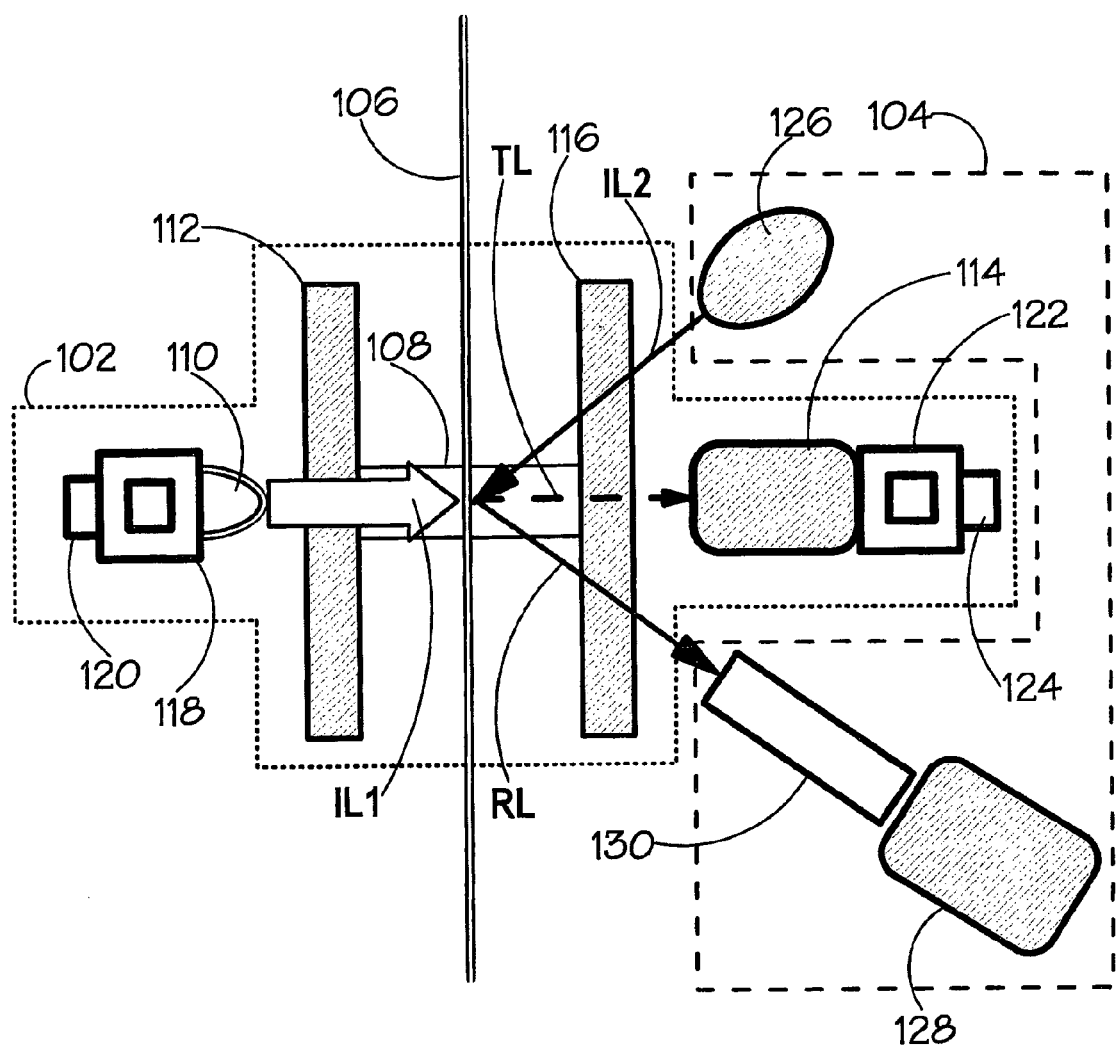
FIG. 4 schematically illustrates a top-view of an authentication apparatus in accordance with one or more embodiments of the present invention.
Figure 5:
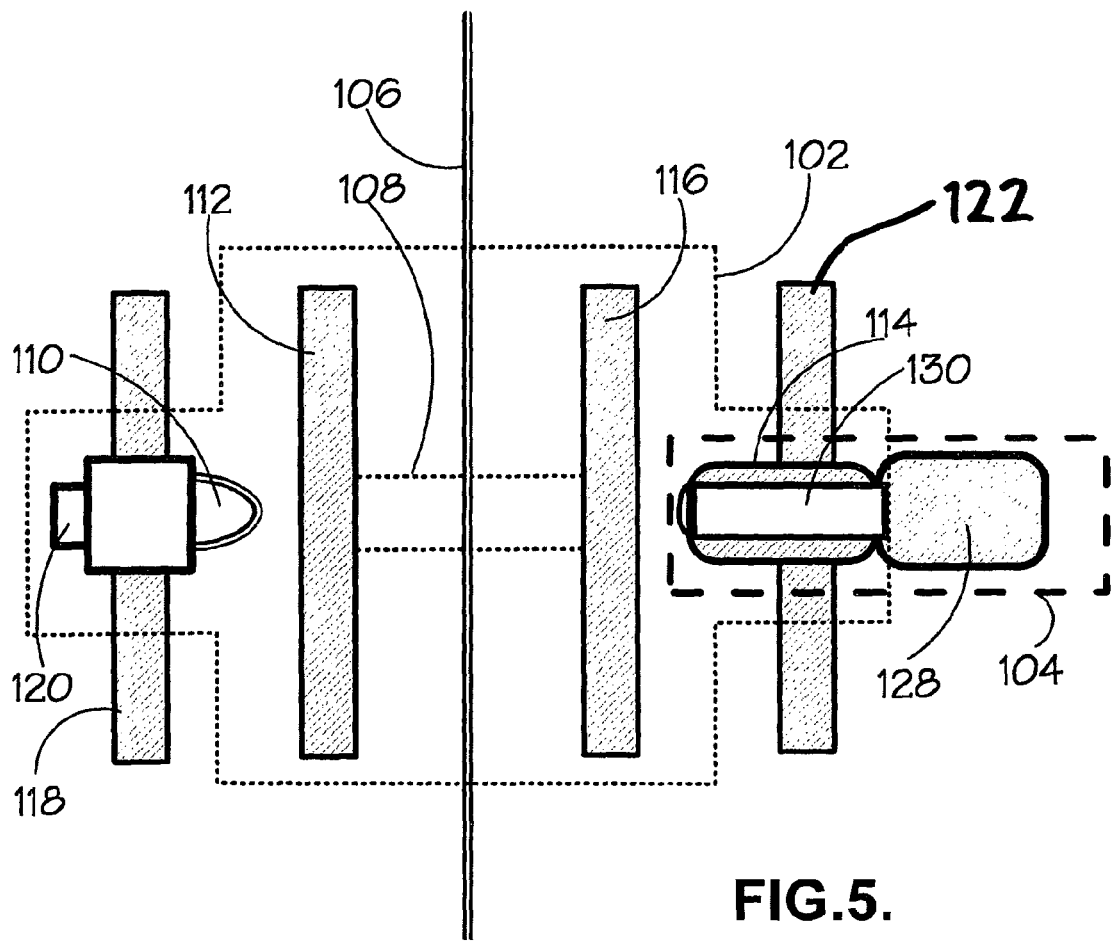
FIG. 5 schematically illustrates a side view of an authentication apparatus in accordance with one or more embodiments of the present invention.
Figure 7:
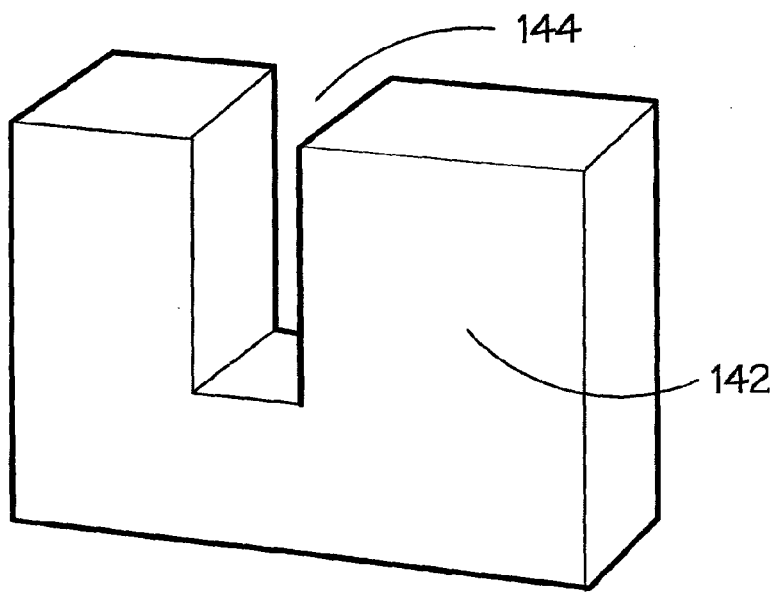
FIG. 7 schematically illustrates the authentication apparatus in an optional arrangement.
Figure 6:
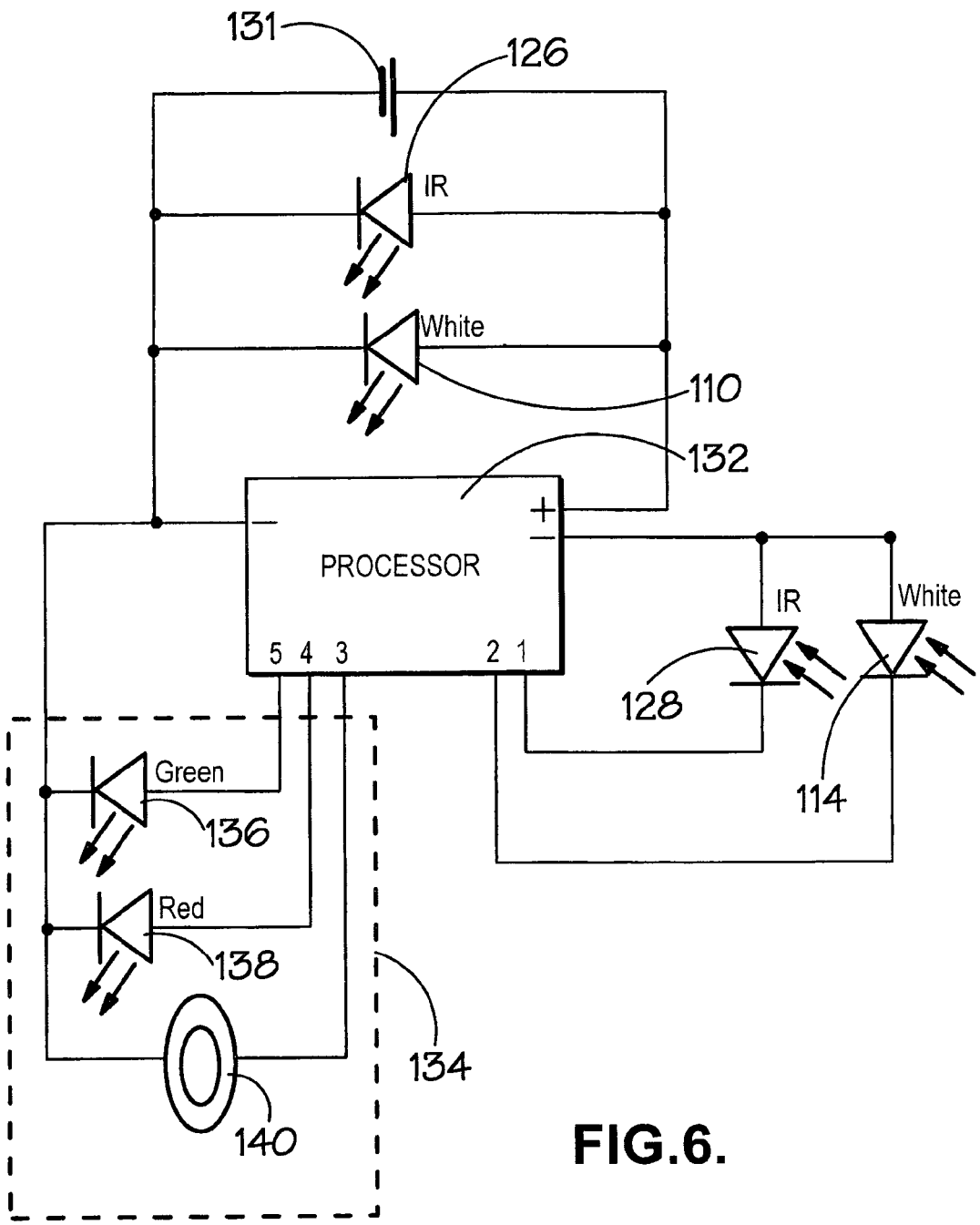
FIG. 6 schematically illustrates a circuit diagram for the authentication apparatus in an illustrative embodiment.
Figure 8A:
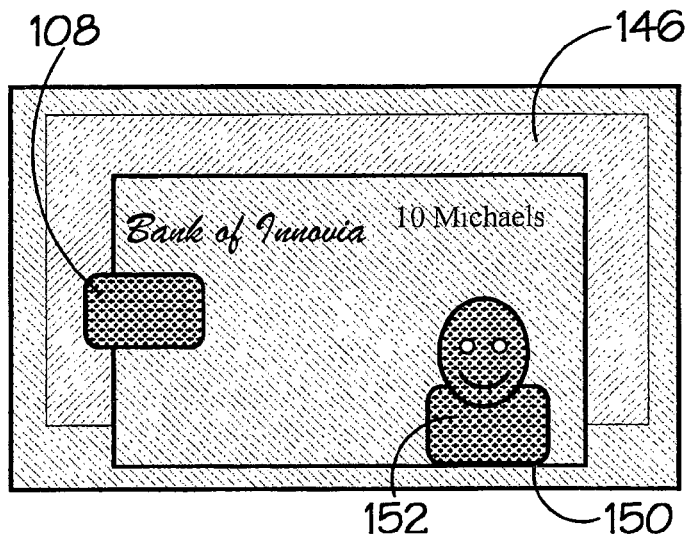
FIGS. 8a and 8b schematically illustrates the authentication apparatus in another optional arrangement.
Figure 8B:
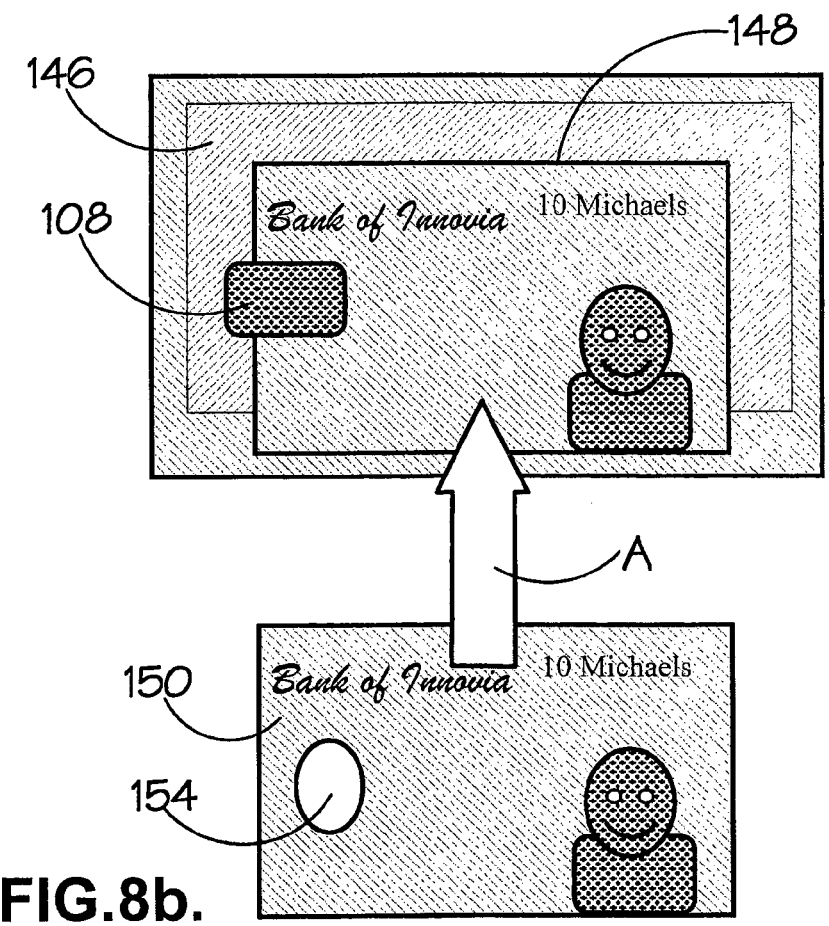
Figure 9A:
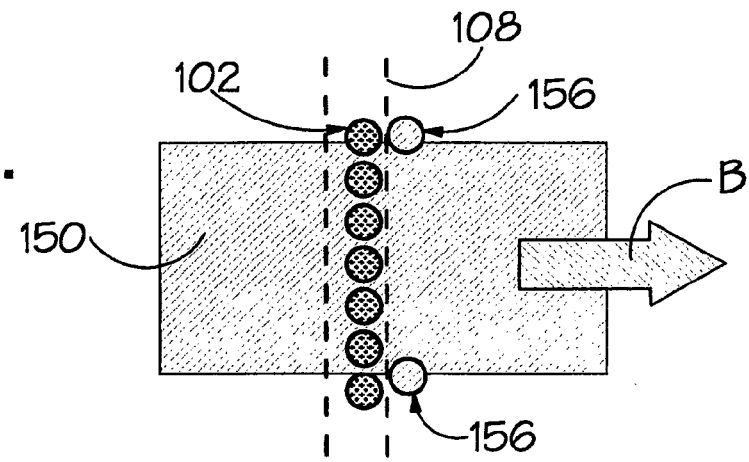
FIG. 9a schematically illustrates a top view of the authentication apparatus in a further optional arrangement.
Figure 9B:
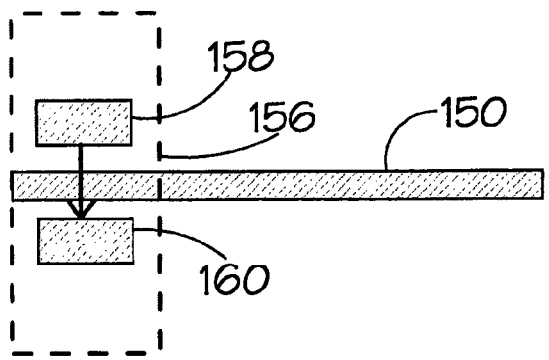
FIG. 9b schematically illustrates a side view of the authentication apparatus in a further optional arrangement.
Figure 9C:
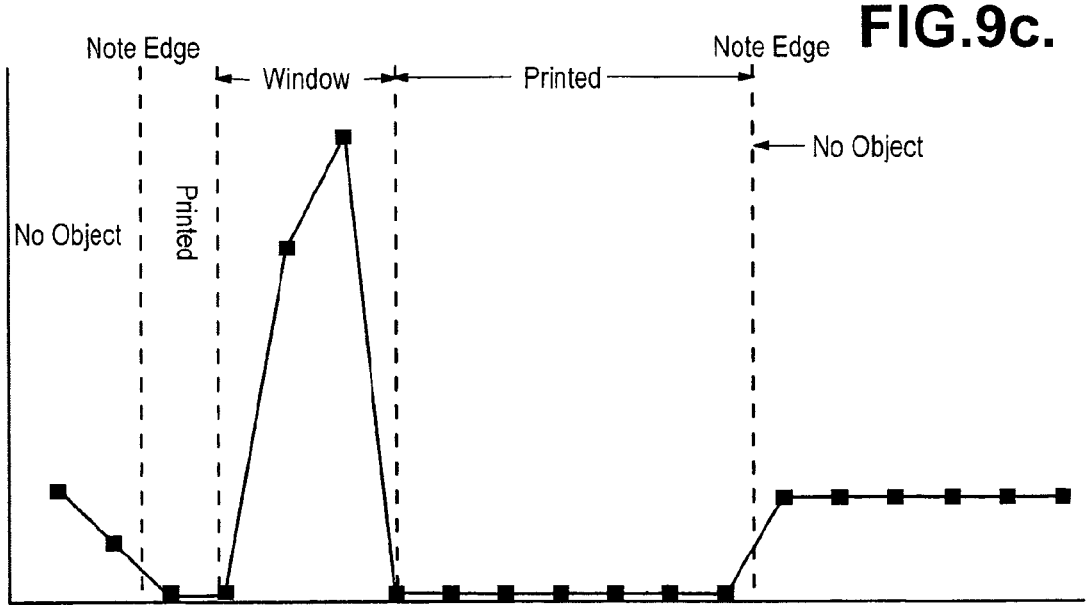

FIGS. 1 to 3 schematically illustrate components of known apparatus for implementing different methods of observing birefringence;

FIG. 4 schematically illustrates a top-view of an authentication apparatus in accordance with one or more embodiments of the present invention;

FIG. 5 schematically illustrates a side view of an authentication apparatus in accordance with one or more embodiments of the present invention;

FIG. 6 schematically illustrates a circuit diagram for the authentication apparatus in an illustrative embodiment;

FIG. 7 schematically illustrates the authentication apparatus in an optional arrangement;

FIGS. 8a and 8b schematically illustrates the authentication apparatus in another optional arrangement;

FIG. 9a schematically illustrates a top view of the authentication apparatus in a further optional arrangement;

FIG. 9b schematically illustrates a side view of the authentication apparatus in a further optional arrangement;

FIG. 9c illustrates a graph of an output signal response of birefringence measuring apparatus of the authentication apparatus of FIG. 9a.

Figure 10A:
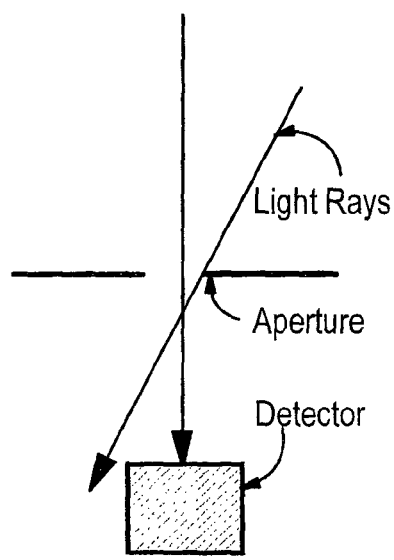
FIGS. 10a, 10b and 10c schematically illustrate detector arrangements of the reflectance measuring apparatus forming part of the authentication apparatus according to one or more embodiments of the present invention.
Figure 10B:
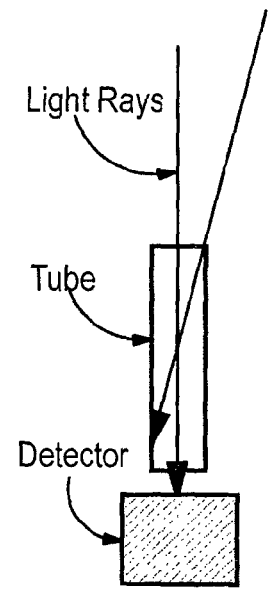
Figure 10C:
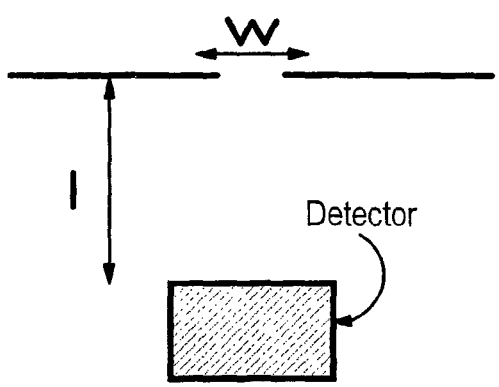
Figure 11:
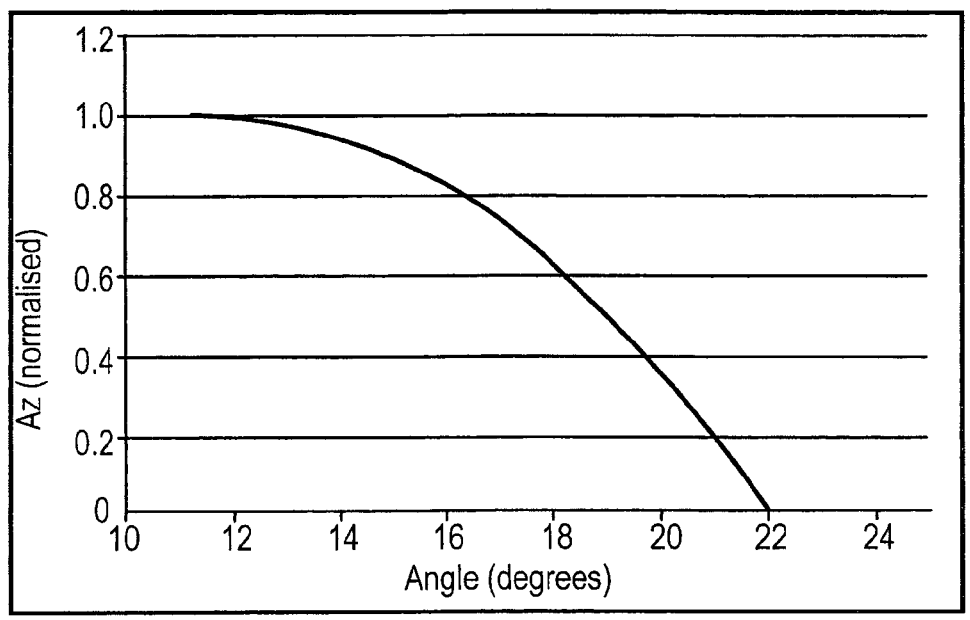
FIG. 11 illustrates a graph plotting intensity of radiation received at a detector dependent upon an angle of incident radiation and an area of the detector.
Figure 12:
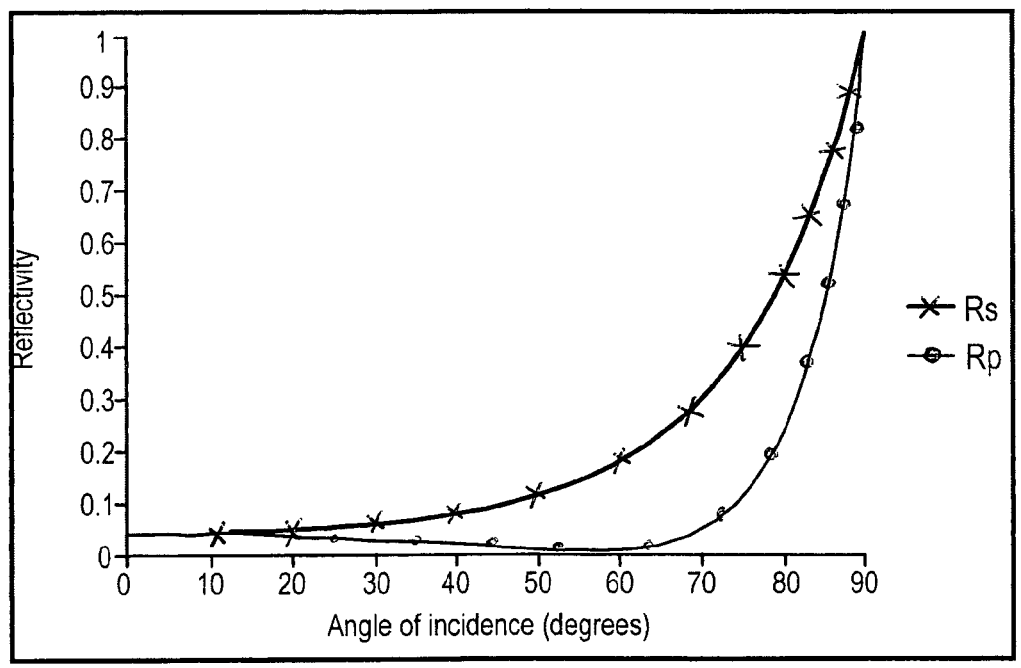
FIG. 12 illustrates a graph plotting angle of incidence of illuminating radiation versus reflectivity of the illuminating radiation from an item surface.
Figure 13:
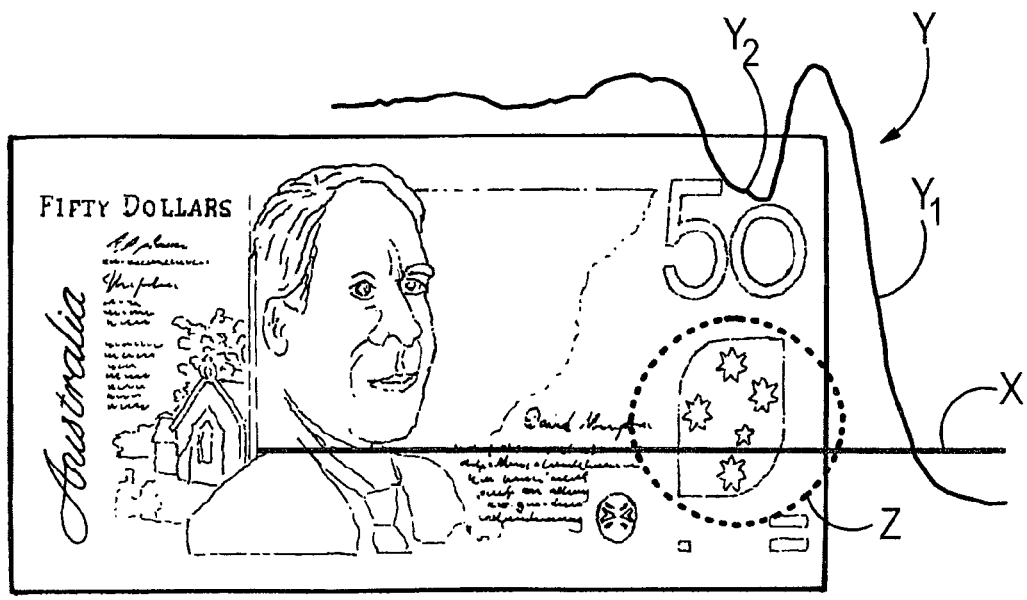
FIG. 13 illustrates a profile of intensity of reflected radiation received by a detector of a reflectance measuring apparatus when a banknote is passed through an authentication apparatus according to one or more embodiments of the present invention.
Figure 14:
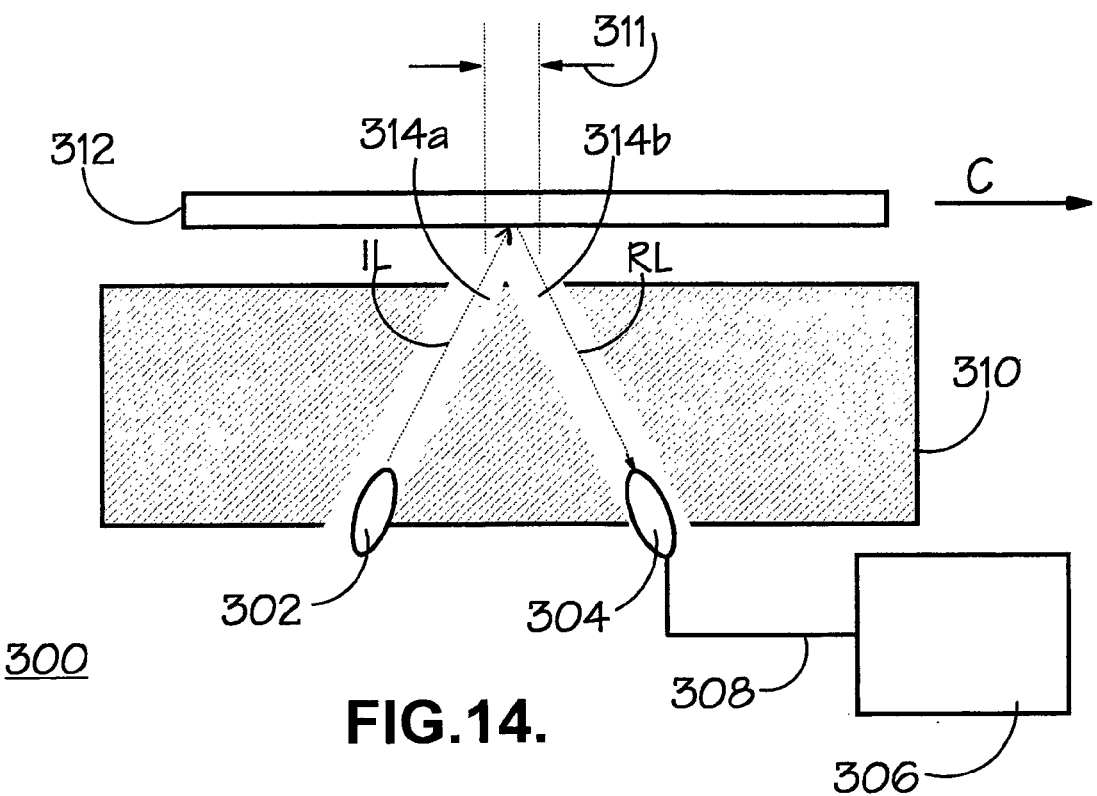
FIG. 14 schematically illustrates a top view of an emitter-detector-item arrangement of the reflectance measuring apparatus for use in an optional arrangement of the authentication apparatus of one or more embodiments of the present invention.
Figure 15:
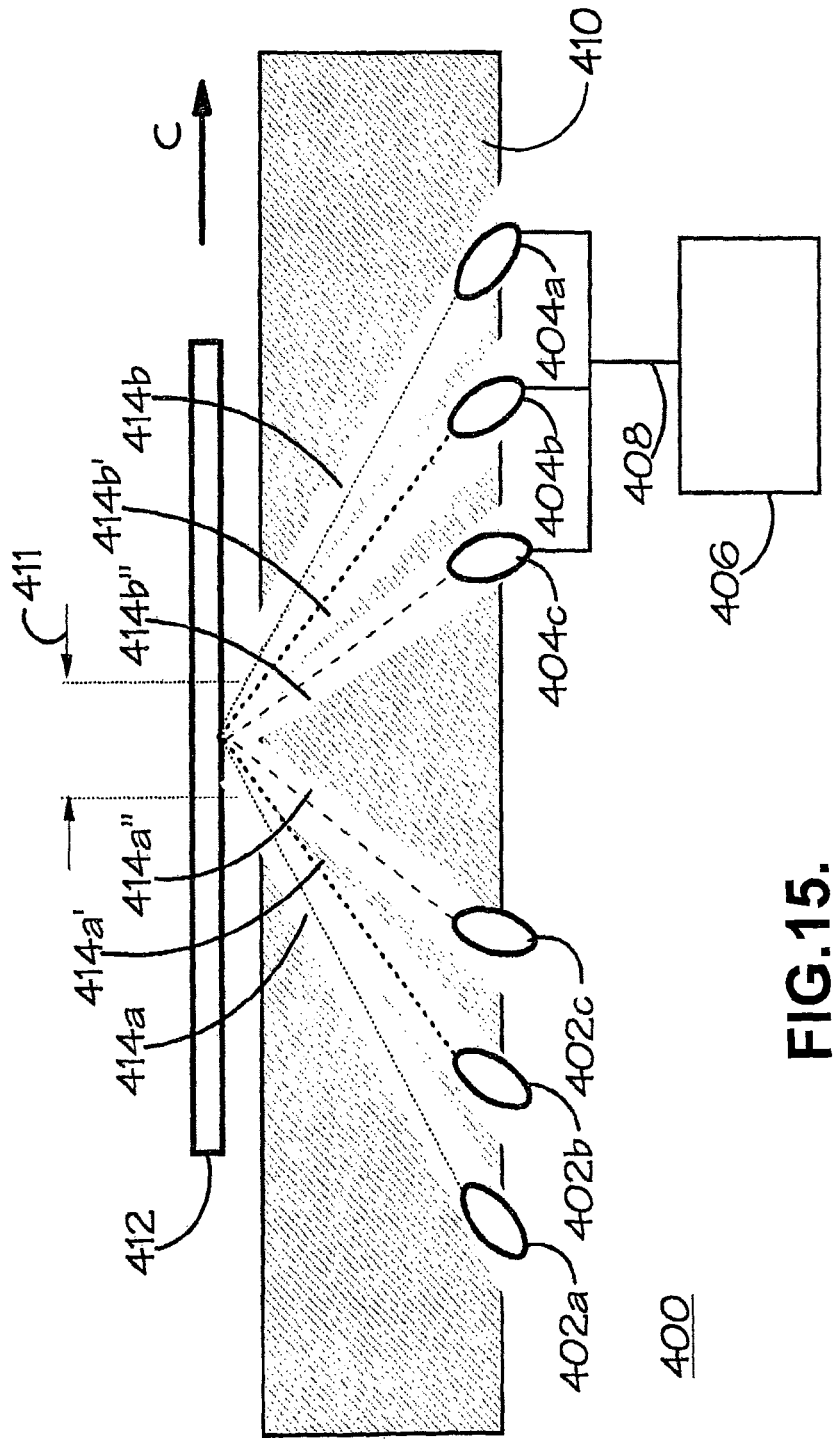
FIG. 15 schematically illustrates a top view of an emitter-detector-item arrangement of the reflectance measuring apparatus for use in an optional arrangement of the authentication apparatus of one or more embodiments of the present invention.
Figure 16:
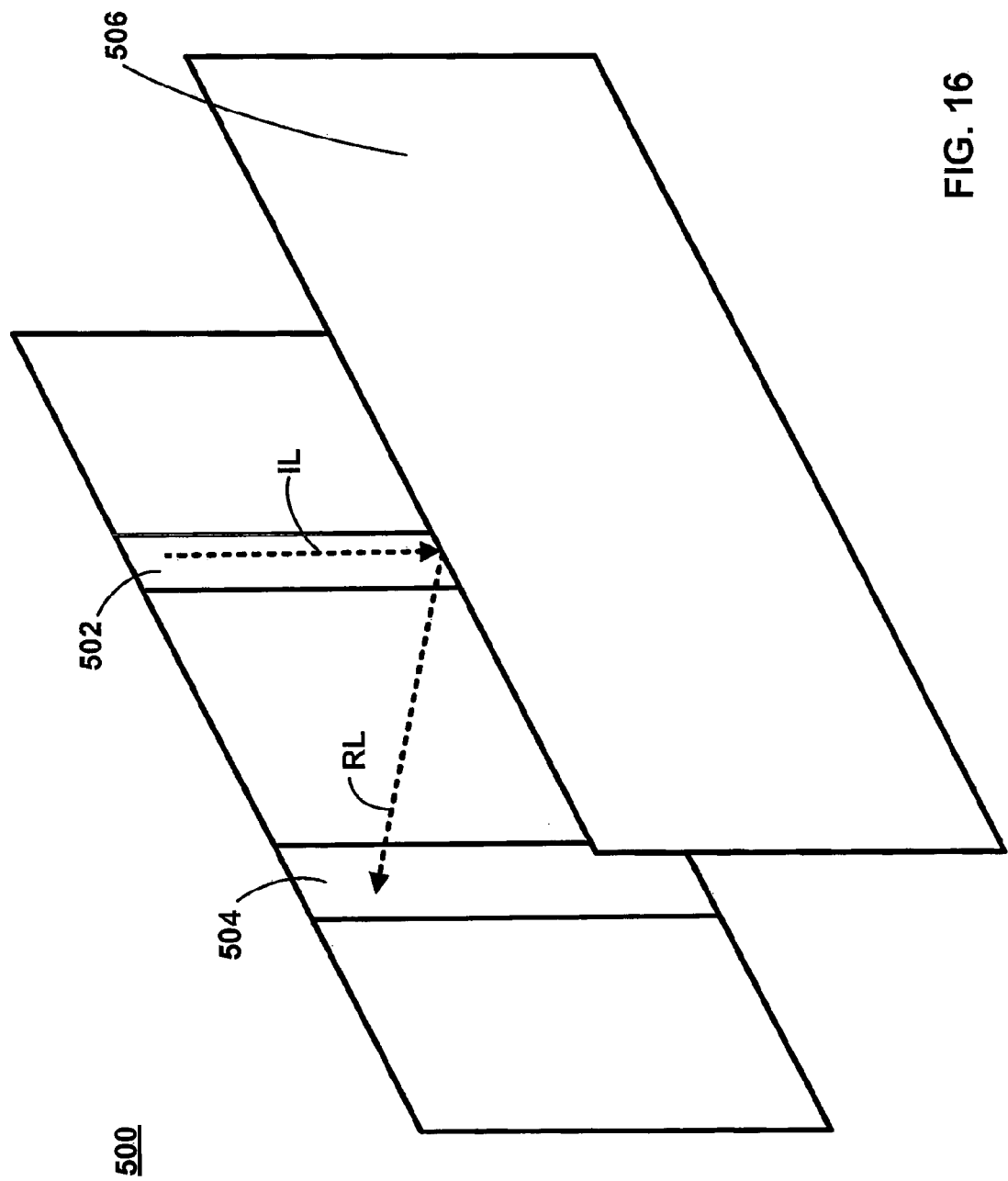
FIG. 16 schematically illustrates a perspective view of an emitter-detector-item arrangement of the reflectance measuring apparatus for use in an optional arrangement of the authentication apparatus of one or more embodiments of the present invention.

FIGS. 10a, 10b and 10c schematically illustrate detector arrangements of the reflectance measuring apparatus forming part of the authentication apparatus according to one or more embodiments of the present invention;

FIG. 11 illustrates a graph plotting intensity of radiation received at a detector dependent upon an angle of incident radiation and an area of the detector;

FIG. 12 illustrates a graph plotting angle of incidence of illuminating radiation versus reflectivity of the illuminating radiation from an item surface;

FIG. 13 illustrates a profile of intensity of reflected radiation received by a detector of a reflectance measuring apparatus when a banknote is passed through an authentication apparatus according to one or more embodiments of the present invention;

FIG. 14 schematically illustrates a top view of an emitter-detector-item arrangement of the reflectance measuring apparatus for use in an optional arrangement of the authentication apparatus of one or more embodiments of the present invention;

FIG. 15 schematically illustrates a top view of an emitter-detector-item arrangement of the reflectance measuring apparatus for use in an optional arrangement of the authentication apparatus of one or more embodiments of the present invention; and FIG. 16 schematically illustrates a perspective view of an emitter-detector-item arrangement of the reflectance measuring apparatus for use in an optional arrangement of the authentication apparatus of one or more embodiments of the present invention.

FIGS. 4 and 5 illustrate an authentication apparatus 100 which comprises a birefringence measuring apparatus 102 and a reflectance measuring apparatus 104.

The authentication apparatus 100 is operative to measure birefringence and reflectance characteristics of an item 106 (e.g. a banknote). In particular, the authentication apparatus 100 is operative to measure birefringence and reflectance characteristics of a portion of the item 106 located in a measuring region 108 of the authentication apparatus 100.

The birefringence measuring apparatus 102 comprises a first emitter 110, or birefringence measurement emitter (optionally an LED operative to emit white-light), a first polariser 112, a first detector 114, or birefringence measurement detector (optionally a photodiode operative to detect white light), and a second polariser 116.

The elements of the birefringence measuring apparatus 102 are arranged such that the first emitter 110 and first polariser 112 are located on a first side of the measuring region 108, and the first detector 114 and the second polariser 116 are located on a second side of the measuring region 110 (i.e. opposite the first emitter 110 and first polariser 112).

First emitter 110 is operative to illuminate the measuring region 108 with electromagnetic radiation (denoted by dotted arrow IL in the figure), and first detector 114 is oriented and operative to receive electromagnetic radiation (denoted by dotted arrow TL in the figure) which is transmitted through a portion of the item 106 located in the measuring region 108. The illuminating electromagnetic radiation IL1 passes through first polariser 112 prior to irradiating a portion of the item 106 located in the measuring region 108. After passing through the portion of the item 106 located in the measuring region 108, the transmitted electromagnetic radiation TL passes through second polariser 116 before being received by first detector 114.

In the illustrated arrangement, the measuring region 108 is located in a first plane. The first polariser 112 is spaced from the first plane and is located in a second plane on a first side of the measuring region 108. The second plane is substantially parallel to the first plane. Similarly, the second polariser 116 is spaced from the first plane and is located in a third plane on a second side of the measuring region 108. It is located opposite the first polariser 112, and the third plane is substantially parallel to the first and second planes.

The arrangement of transmission orientations of the first and second polarisers 112, 116 is such that they comprise crossed polarisers. That is, the first polariser 112 is arranged such that a transmission orientation thereof is about +45° to a transmission orientation of the portion of the item 106 located in the measuring region 108. The second polariser 116 is arranged such that a transmission orientation thereof is about −45° to the transmission orientation of the portion of the item 106 located in the measuring region 108. Alternatively, the transmission orientation of the first polariser 112 may be such that it is about −45° to a transmission orientation of the portion of the item 106 located in the measuring region 108 and the transmission orientation of the second polariser 116 may be such that it is about +45° to the transmission orientation of the portion of the item 106 located in the measuring region 108.

Thus, in the illustrated arrangement, the illuminating electromagnetic radiation IL1 emitted by first emitter 110 will be polarised by the first polariser 112, irradiate the portion of the item 106 located in the measuring region 108, pass through the item 106, continue as transmitted electromagnetic radiation TL to the second polariser 116 (i.e. crossed polariser) and pass therethrough, and continue for reception by the first detector 114. The first detector 114 responsive to detection of transmitted electromagnetic radiation TL incident thereon, outputs a signal proportional to the intensity of received transmitted electromagnetic radiation TL to a processing means (not shown).

The processing means, upon receiving an output signal from the first detector 114, is operative to compare a value of the received signal with a set of pre-defined values stored in a database (not shown). These pre-defined values may correspond to expected transmitted electromagnetic radiation values when one or more of: a printed region of an item is located in the measuring region 108; an unprinted region of an item (e.g. a window region or item authentication region) is located in the measuring region 108 (where the film substrate of the item is genuine); an unprinted region of an item (e.g. a window region) is located in the measuring region 108 (where the film substrate of the item is not genuine); and no banknote is located in the measuring region 108.

The first emitter 110 is slidably mounted on a rail or rod 118. The first emitter 110 may be fixed at a particular position along a length of said rail or rod 118 by way of fixing screw 120. This arrangement allows the position of the first emitter 110 relative to the measuring region 108 to be altered. Similarly, first detector 114 is slidably mounted on a rail or rod 122. The first detector 114 may be fixed at a particular position along a length of said rail or rod 122 by way of fixing screw 124. Again, this arrangement allows the position of the first detector 114 relative to the measuring region 108 to be altered.

An item 106 comprising a film that is highly oriented will give rise to a high reading from the first detector 114 (because a large amount of electromagnetic radiation will be transmitted, i.e. the intensity of the transmitted electromagnetic radiation TL will be relatively high). However, a balanced film will give rise to a zero-value or low reading from the first detector 114 because the behaviour of the electromagnetic radiation through the first and second crossed polarisers will be largely unaltered.

Films having a balanced orientation (e.g. BOPP films) will produce a low birefringence signal at the first detector 114. Such a signal may be substantially the same as that corresponding to a printed area of film or no film at all in the measuring region 108. On the other hand, when a stenter or other oriented film is located in the measuring region 108, the first detector 114 will produce a high birefringence signal that will be different from all the above situations.

The birefringence measuring apparatus 102 is therefore capable of operating on the basis of a "item is authentic" result all the time until an item comprising a false piece of film is encountered, at which point an alarm and/or visual alert may be activated: in other words it will find a negative but not identify a positive.

To counter this, the authentication apparatus 100 includes the reflectance measuring apparatus 104.

The reflectance measuring apparatus 104 comprises a second emitter 126, or reflectance measurement emitter (optionally an LED operative to emit electromagnetic radiation in the infra-red region of the electromagnetic spectrum), a second detector 128, or reflectance measurement detector (optionally a photodiode operative to detect electromagnetic radiation in the infra-red region of the electromagnetic spectrum), and a shade 130 associated with the second detector 128. The shade 130 serves to protect the second detector 128 from stray light so as to prevent false readings caused by stray light being incident upon the second detector 128 from sources other than the second emitter 126.

The reflectance measuring apparatus 104 is configured such that the second emitter 126 and second detector 128 are oriented to face the measuring region 108. Second emitter 126 is operative to illuminate the measuring region 108 with electromagnetic radiation (denoted by arrow IL2 in the figure), and second detector 128 is oriented and operative to receive electromagnetic radiation (denoted by arrow RL in the figure) reflected from the portion of the item 106 located in the measuring region 108.

In an optional arrangement, the authentication apparatus 100 may comprise a path along which an item may be conveyed. The measuring region 108 forms part of this path. Thus, in this particular arrangement, the item may be conveyed along the path from one side of the authentication apparatus 100 to the other and, during its transit, pass through the measuring region 108. That is, in this optional arrangement, the item to be authenticated may be moved relative to the authentication apparatus 100 or vice versa. Such an optional arrangement will be described in more detail in relation to FIG. 7. In another optional arrangement, authentication measurement may take place when an item is static. That is, the item may be introduced to an item location region (of which the measuring region 108 forms part) of the authentication apparatus 100, where the item is held until an authentication measurement has taken place. Such an optional arrangement will be described in more detail in relation to FIGS. 8a and 8b.

In operation, the item 106 is introduced into the authentication apparatus 100 such that a portion of the item 106 will be located in the measuring region 108. At that time, illuminating electromagnetic radiation IL2 from second emitter 126 is incident upon the portion of the item 106 located in the measuring region 108. At least a portion of the illuminating electromagnetic radiation IL2 incident upon the item 106 in the measuring region 108 will be reflected by the portion of the item 106 in the measuring region 108. This reflected electromagnetic radiation RL is reflected toward second detector 128. As it nears the second detector 128, it will pass through an aperture of shade 130 and is then detected by second detector 128. The second detector 128, responsive to detection of reflected electromagnetic radiation RL incident thereon, outputs a signal proportional to the intensity of received reflected electromagnetic radiation RL to the processing means (not shown).

The processing means, upon receiving an output signal from the second detector 128, is operative to compare a value of the received signal with a set of pre-defined values stored in a database (not shown). These pre-defined values may correspond to expected reflected electromagnetic radiation values when one or more of: a printed region of an item is located in the measuring region 108; an unprinted region of an item (e.g. a window region) is located in the measuring region 108 (where the film substrate of the item is genuine); an unprinted region of an item (e.g. a window region) is located in the measuring region 108 (where the film substrate of the item is not genuine); and no banknote is located in the measuring region 108.

The processing means may be arranged to transmit an output signal to one or more visual or audio alert systems based upon output signals received from said first detector 114 and second detector 128.

Therefore, in an optional arrangement, if no item is present in the measuring region 108, the processing means may issue an output signal to control a visual alert system to display a first visual alert (e.g. a red light) and an audio alert system to output a first audio alert (e.g. a buzzer). If a printed region of an item is present in the measuring region 108, the processing means may issue an output signal to control a visual alert system to display a first visual alert (e.g. a red light) and an audio alert system to output a first audio alert (e.g. a buzzer). If a window region of an item is present in the measuring region 108 and where the film substrate forming the item is genuine (as determined by the birefringence measuring apparatus), the processing means may issue an output signal to control a visual alert system to display a second visual alert (e.g. a green light) and an audio alert system to be silent. If a window region of an item is present in the measuring region 108 and where the film substrate forming the item is non-genuine (as determined by the birefringence measuring apparatus), the processing means may issue an output signal to control a visual alert system to display a first visual alert (e.g. a red light) and an audio alert system to output a first audio alert (e.g. a buzzer).

This apparatus 100 may be implemented in, for example, a banknote counting system. The processing means may be operative to output a signal to a counting device only when the signals received from the birefringence measuring apparatus 102 and the reflectance measuring apparatus 104 are indicative that a window region of the item 106 is located in the measuring region 108, and that the film substrate forming the window region is authentic. However, no signal may be output when the signals received from the birefringence measuring apparatus 102 and the reflectance measuring apparatus 104 are indicative that a window region of the item 106 is located in the measuring region 108, but that the film substrate forming the window region is not authentic. That is, a count made by the counting device may be altered only when a genuine window region is registered in the measuring region 108.

In the illustrated arrangement of FIGS. 4 and 5, the first emitter 110 comprises a light emitting diode (LED) which is operative to emit white light and the first detector 114 comprises a photodiode operative to detect white light.

Further, the second emitter 126 comprises an LED which is operative to emit electromagnetic radiation at wavelengths corresponding to the infra-red (IR) region of the electromagnetic spectrum. Optionally, the LED is operative to emit electromagnetic radiation with wavelengths about 890 nm.

The second detector 128 in the illustrated arrangement comprises a photodiode operative to detect electromagnetic radiation at wavelengths corresponding to the IR region of the electromagnetic spectrum and, optionally, to detect electromagnetic radiation with wavelengths between about 880 nm and 1140 nm.

Of course, in further optional arrangements, the second emitter 126 and second detector 128 may be operative to emit and detect electromagnetic radiation at other wavelengths in the electromagnetic spectrum.

In the arrangement where the LED of the second emitter 126 is operative to emit electromagnetic radiation having wavelengths of about 890 nm, the photodiode of the second detector 128 is operative to generate a voltage of approximately 350 mV max upon the detection of light between 880 nm and 1140 nm.

The sensitivity of reflectance measuring apparatus 104 is dependent upon the angle of the second emitter 126 and second detector 128 to one another, the distance and angle of the measuring region 108 relative to the second emitter 126 and second detector 128, the levels of ambient light and the size of the shade 130.

The shade 130 in the illustrated arrangement comprises a tubular element (optionally a black tube). The second detector 128 may be located at, or near, one end of the tubular element on a first side of the shade 130 (or (or within the tubular element near a first side of the shade 130). The tubular element is located and oriented relative to the second emitter 126 and measuring region 108 such that reflected electromagnetic radiation RL reflected from the measuring region 108 enters the tubular element at a mouth portion thereof. After entering the tubular element via mouth portion, the reflected electromagnetic radiation RL travels along tubular element to the second detector 128. The length and diameter of the tube determine the angle range of incident electromagnetic radiation that is admitted to the second detector 128 (i.e. the longer and narrower the tube is, the narrower the angle range of incident electromagnetic radiation that is admitted). An arrangement such as this can differentiate between a polymer window, a printed surface and air due to differences in the gloss of each of these materials.

With the gloss measurement (i.e. the measurement performed by the reflectance measuring apparatus 104) in place, the authentication apparatus 100 now has the information that the birefringence is either low or high and that there is the presence or absence of a window. Optionally, the reflective gloss system is positioned on the opposite side of the polarisation system from the first emitter 110, to reduce or inhibit the impact of light leakage from the first emitter 110 into the infra-red detector (light is only permitted through the films when there is a highly birefringent film between them, at this point light leakage into the infra-red detector is unimportant because there will actually be a window present).

The width of the spacing between the reflectance measuring apparatus 104 and the item to be authenticated will affect the accuracy of the window presence detection system (i.e. reflectance measuring apparatus 104). There may be a trade-off between the minimum practical width of the item slit, to ensure the flattest possible reading and the range of angles accepted by the second detector (the wider the range accepted, the greater the danger of false signals).

An issue of consequence for component placement is the vertical position and size of the first emitter, 110, first detector 114, second emitter 126 and second detector 128. Item windows (e.g. banknote windows) are not always in the same place vertically and, whilst a swiping system (e.g. as illustrated in FIG. 7) would take into account the horizontal placement of the window, the vertical placement of the window in the item would need to be taken into account also. To counter this, in an optional arrangement, two or more positions of the item surface could be measured and/or the emitters and detectors could be movable. As is illustrated in FIGS. 4 and 5, the emitters and detectors are mounted on rails 118, 122. To allow flexibility of the authentication apparatus 100 where it is to be used to authenticate items such as, for example, banknotes (where the window region locations in notes may be different for different denominations or where window region locations in notes may be different for different countries), the rail system could allow an initial adjustment to be made to the specified height, and then the emitters and detectors could be fixed at that height.

Optionally, multiple emitters and detectors may be mounted on the same rail and/or longer detector arrays and emitter sources could be employed.

FIG. 6 is a schematic circuit diagram for the authentication apparatus 100. Features such as, for example, capacitors, resistors, etc. are omitted to aid clarity.

The circuit comprises a power source 131 which is operative to power the first emitter 110, second emitter 126 and processor 132.

First detector 114 and second detector 128 are coupled to the processor 132 (optionally a microcontroller) so that output signals output by these devices are received by the processor 132. An output signal from first detector 114 is fed into gate 2 of the processor 132 and an output signal from second detector 128 is fed into gate 1 of the processor 132.

Either one, or both, detectors 114, 118 optionally may have coupled between the output(s) thereof and the processor 132 a variable resistor. This may provide a means to control the level of signal from the optical systems, thus allowing for calibration of the apparatus.

An alert system 134 is coupled to the processor 132. The alert system comprises a visual alert element (i.e. a green LED 136 and a red LED 138 in the illustrated arrangement), and an audio alert element (i.e. a buzzer 140 in the illustrated arrangement). These are coupled to gates 3, 4 and 5 of the processor 132. Of course, other elements may be used in addition to, or in place of those illustrated in an alert system in other optional arrangements.

Table 1 below summarises the inputs and outputs which describe the behaviour of the elements of the illustrated circuit when the apparatus is used in relation to banknotes.

TABLE 1

Summary of circuit element behaviour

| Condition | Detector | | Gate | | | | | Result |
| | First detector 144 (birefringence) | Second detector 128 (reflectance, i.e. window detection) | 1 | 2 | 3 | 4 | 5 | |
| --- | --- | --- | --- | --- | --- | --- | --- | --- |
| No note | low | low | 0 | 0 | 1 | 1 | 0 | Red light and buzzer |
| Non-window (e.g. printed region) | low | high | 0 | 0 | 1 | 1 | 0 | Red light and buzzer |

TABLE 1-continued

Summary of circuit element behaviour

| | Detector | | | | | | | |
|---|---|---|---|---|---|---|---|---|
| | First detector 144 | Second detector 128 (reflectance, | Gate | | | | | |
| Condition | (birefringence) | i.e. window detection) | 1 | 2 | 3 | 4 | 5 | Result |
| Authentic window | low | medium | 1 | 0 | 0 | 0 | 1 | Green light |
| Non-authentic window (i.e. counterfeit film) | high | medium | 1 | 1 | 1 | 1 | 0 | Red light and buzzer |

The presence of a window results in a reflective signal between that of no window and the presence of a note in intensity. Thus, the reflectance measuring apparatus must be able to differentiate between the three states (i.e. no note, window region of note, or printed region of note present in measuring region) to enable the authentication apparatus to function to output a signal only when a window region of a note is present in the measuring region. This may be useful as a mechanism to control power use of the apparatus, i.e. the presence of a window region of a note acts as a switch to turn on the apparatus to conduct a birefringence measurement. Otherwise, the apparatus may remain (or revert) to a standby mode.

The operation of the authentication apparatus may be summarised as follows. Electromagnetic radiation signals (e.g. light signals) are measured from when the authentication apparatus is turned on. When an item (e.g. banknote) edge enters the measuring region, there is likely to be a fluctuation or change in the measurement readings being taken by the reflection measuring apparatus. There is likely to be a further fluctuation or change when a window region of the item passes through the measuring region. When this occurs, the birefringence measurement performed at that time is noted. If the birefringence measurement is relatively low, the authentication apparatus indicates that the item is authentic. However, if the birefringence measurement is relatively high, the authentication apparatus indicates that the item is counterfeit. Thus, an item will be deemed genuine, once a window has been detected in the measuring region, and the birefringence measurement performed, and the birefringence measurement value is indicative that the note is authentic. Failure to detect any window may result in no output being generated by the authentication apparatus.

FIG. 7 illustrates a device 142 which may be suitable for authenticating banknotes. The device 142 includes the authentication apparatus 100 in any one or more of the arrangements described above. The device 142 may be suitable as a portable hand-held device.

The device 142 comprises a substantially U-shaped unit with a slot 144 through which banknotes may be conveyed (e.g. "swiped"). Optionally, the slot depth is 40 mm (approximately half the size of larger denomination polymer film substrate banknotes in circulation in one or more countries). As the window region of the banknote passes the birefringence measuring apparatus of the authentication apparatus located inside the device 142, the signal output by the authentication apparatus is conveyed to an illumination device which is operative to illuminate the device with either a green or red light depending on the birefringence reading of the window. For example, if the banknote is formed from an authentic polymer film, the device 142 may be illuminated with green light. However, if the banknote is formed from a non-authentic polymer film, the device 142 may be illuminated with red light.

The dimensions of the device 142 may depend upon the size of the electronics and power source that are required to allow the device to function. However, a required dimension is that of the slot height. The slot 144 must be of sufficient depth so that, as a banknote is conveyed through the slot, the window of the banknote passes between the upstanding portions of the device 142 either side of the slot 144 (and thus between the elements of the birefringence measuring apparatus and the reflectance measuring apparatus). Another required dimension will be that of the slot width, which should be a compromise between a narrow enough slot to maintain banknote flatness during passage through the slot 144 for an accurate result and a wide enough slot to allow ease of passage of the banknote through the slot 144. Optionally, a slot width of between about 0.5-1 mm may be employed. Further optionally, the slot 144 may comprise curved entry and/or exit points to assist insertion of a banknote end into the slot 144 and/or to assist removal of the banknote from the slot 144.

FIGS. 8a and 8b illustrate another optional authentication apparatus arrangement. In this arrangement, the authentication apparatus may be suitable for banknote authentication when the banknote is static.

In this arrangement, there is provided a positioning bund 146 which comprises a surface for receiving the banknote thereon. The positioning bund 146 comprises a note template 148 provided thereon. For example, the note template 148 may be engraved into the surface of the positioning bund 146 such that a recessed region is formed in the surface of the positioning bund 146. This recessed region may be of similar dimensions to a banknote and is shaped to receive a banknote therein.

Therefore, in use, the banknote 150, comprising one or more printed surface features 152 and a window region 154 is placed on the note template 148 of the positioning bund 146 and guided into position (see arrow A) using raised edges formed at the edge of the recessed region. Elements of the authentication apparatus are located above and below the positioning bund so as to take measurements of a portion of the banknote 150 located in the measurement region 108 of the positioning bund 146. The measurement region 108 is located with respect to the positioning bund 146 so as to be coincident with the window region of a banknote when such a banknote is located on the positioning bund 146. The reflectance measuring apparatus of the authentication apparatus detects when a window region of a banknote is in place in the measuring region 108 and the authentication apparatus is then operative to perform birefringence measurement on the window region 154.

To enable the illustrated arrangement to be suitable for different denominations and/or different currencies (which are likely to be of different sizes), a series of banknote outline templates could be provided (e.g. engraved) on the positioning bund. A user could hold a banknote against the appropriate banknote outline. This could be done, for example, by using raised edges at the top and either left or right of the positioning bund 146 to guide the note into position (depending on where the windows are more consistently positioned).

Different sizes and positions of windows could be accommodated, in optional arrangements, by providing multiple birefringence measurement positions.

FIGS. 9a and 9b illustrate top and side views of an authentication apparatus according to another optional arrangement. This arrangement may be suitable for a moving system, i.e. one where an item (e.g. a banknote) is moved relative to the authentication apparatus (or vice versa).

In the illustrated arrangement, there is shown an banknote 150 being conveyed in a direction indicated by arrow B relative to a birefringence measuring apparatus 102, and through a measuring region 108. In the illustrated arrangement, the birefringence measuring apparatus 102 comprises an array of birefringence measuring elements across the measuring region width. These sensors birefringence measuring elements are operative to indicate whether birefringence of a portion of the banknote 150 in the measuring region 108 is high or otherwise. The illustrated arrangement further comprises a note detector arrangement 156 located adjacent to the birefringence measuring apparatus 102. This note detector arrangement 156 is operative to emit, from an emitter 158, or array of emitters (item detection emitters) an electromagnetic radiation beam toward the banknote transport path. A detector 160, or array of detectors (item detection detector) are located, and operative, to receive electromagnetic radiation from said electromagnetic radiation beam transmitted across said banknote transport path and/or reflected from said transport path. Therefore, when a banknote enters the region of the banknote transport path illuminated by the electromagnetic radiation beam emitted by the emitter 158 of the note detector arrangement 156, the presence of the banknote is detected by the note detector arrangement 156. That is, when a banknote is present in the transport path, the electromagnetic radiation beam emitted by emitter 158 may be reflected by the banknote and received at a detector located to receive reflected electromagnetic radiation, or the beam may be attenuated as it passes through the banknote, and a detector located to receive transmitted electromagnetic detection may detect a decrease in the transmitted electromagnetic radiation being received (due to presence of the banknote in the beam). Thus, the note detector arrangement 156 may be operative to detect presence or otherwise of the banknote 150 by reflection of the irradiating electromagnetic radiation beam when the banknote 150 is present and/or by a reduction in the intensity of the transmitted irradiating electromagnetic radiation beam (due to presence of the banknote in the beam). Therefore, when a banknote 150 cuts the irradiating electromagnetic radiation beam, the note detector arrangement 156 detects the presence of the banknote 150. The note detector arrangement 156 is operative to control operation of the birefringence measuring apparatus 102 such that the birefringence measuring apparatus 102 performs measurements only when a banknote is present.

A reflectance measuring apparatus optionally may be present or may not be present. In an optional arrangement without the reflectance measuring apparatus, the birefringence measuring apparatus is operative to detect low/high birefringence readings at all times, but decisions are only made when the note detector arrangement presence sensor detects a note.

In such a "transmission only" arrangement, i.e. birefringence measurement but not reflectance measurement, the apparatus is operative to determine that a window is present in the measuring region by noting the signal of the detector(s) of the birefringence measurement apparatus. A background signal will result in a comparatively medium-level output signal from the detector(s). When a printed portion of a banknote is present in the measuring region (i.e. printed region blocks detector(s)), this will result in a comparatively low-level output signal from the detector(s). When a window region of a banknote is present in the measuring region (background signal plus birefringence), this will result in a comparatively high-level output signal from the detector(s) when a counterfeit banknote is present and a comparatively low-level output signal when an authentic window is present. FIG. 9c illustrates the detector(s) response when various portions of a counterfeit banknote are measured using the apparatus. As can be seen from FIG. 9c, when a printed portion of a banknote is present in the measuring region, the illuminating radiation emitted by the emitter(s) is blocked by the printed portion of the banknote and very little of the illuminating radiation is transmitted through the banknote to reach the detector(s). When a window region of the counterfeit banknote is present in the measuring region, the output signal from the detector(s) is comparatively high, and the apparatus is operative to output a signal that that the banknote is counterfeit.

In optional arrangements, there may be one or two or even a complete row of note detectors. They could be transmissive (as illustrated in FIG. 9b) or reflective. The electromagnetic radiation emitted by an emitter of the note detector arrangement may be white light or even a narrow band infra-red light.

Table 2 below illustrates a decision table for the elements of the authentication apparatus of the optional arrangement illustrated in FIGS. 9a and 9b.

TABLE 2

| Birefringence measuring apparatus output | Note detector arrangement output | Authentication apparatus output |
| --- | --- | --- |
| High | No banknote present | No output |
| Low | No banknote present | No output |
| High | Banknote present | Fail (banknote counterfeit) |
| Low | Banknote present | Banknote authentic |

The arrangement of FIGS. 9a to 9c may be used in combination with the features of the arrangements illustrated in FIG. 7 or FIGS. 8a and 8b, and as described above.

The parameters which may be relevant to a reflectance measuring apparatus forming part of an authentication apparatus according to one or more embodiments of the present invention will now be discussed. Since the reflectance measuring apparatus is operative to measure the reflected signal from a polymer surface, it is desirable that the reflections are be specular and from as narrow an angular range as possible to ensure that only reflections from film that is in the measurement region are accepted.

In the following description, any reference to "light" is intended to include electromagnetic radiation in both the "visible" part of the electromagnetic spectrum and also the "invisible" part of the electromagnetic spectrum.

Shade Aperture

In those arrangements in which the detector of the reflectance measuring apparatus is protected by a shade, the dimensions of a shade aperture should be considered. In some optional arrangements, the shade aperture may simply comprise a hole or slit in the shade. In other optional arrangements, the shade aperture may comprise a tube which, optionally, is composed of, or lined with, a non-reflective material.

The aperture width determines the amount of electromagnetic radiation rays collected at any angle, but is indiscriminate as to the origin of these rays and so does not help eliminate noise from ambient electromagnetic radiation sources or scatter.

The "set-back distance" (i.e. the distance between the second detector and the item-side of the shade aperture—the "aperture mouth") is related to the accuracy of the apparatus. A large distance between the aperture mouth and the second detector will mean that only very precisely angled light will travel the length of the aperture tube to the second detector.

The set-back distance may be limited by the physical constraints of the device inside which a detector such as this would be fitted.

The accuracy of the apparatus may also be dependent upon the aperture width. That is, accuracy of the apparatus may depend on the ratio of the aperture width to the set-back distance. Therefore, in larger devices in which a larger set-back distance can be employed, a larger aperture width may be used. However, for more constrained, smaller devices, in which the set-back distance may be small, a narrower aperture should be used. Consequently, this will mean a reduction in the rays collected and therefore sensitivity of the device.

The aperture of the shade is designed to exclude high angle light. It does this via the use of a narrow opening with the second detector offset, or "set-back" from the opening. There are two optional arrangements which may be suitable: a black tube, which will absorb stray radiation in its walls (i.e. an arrangement such as that illustrated in FIG. 4 and as described above); and an open space behind the aperture where high angle light will be propagated out of the range of the second detector.

These optional arrangements are illustrated schematically in FIGS. 10a and 10b. The optional arrangements can be simplified (for the process of performing calculations) to the arrangement illustrated in FIG. 10c.

Referring to FIG. 10c, w is the aperture or tube width and l is the offset or "set-back" distance of the second detector from the aperture. The tube based design may be a more efficient one when the second detector is wider than the aperture/tube diameter. For an aperture design, if the second detector is wider than the aperture, then the range of light angles that are accepted by the second detector will be greater and for the following calculations, w would become the second detector width.

The exception to this is the accuracy of the device, which is proportional to the entrance width for the optical system.

The angle at which light entering the system is at its maximum intensity, $\theta_{max}$ is:

$$\theta_{max} = \tan^{-1}\left(\frac{w}{l}\right) \tag{1}$$

At angles higher than this, light rays that enter the optical system can reach only a fraction of the area of the second detector and so can be regarded as losing their intensity proportional to the angular area of the second detector they are incident upon.

This area, $A_z$, can be calculated by first setting an exclusion diameter, z, at the centre of the aperture's cross-sectional area. From z, the area of a central zone that cannot be accessed by higher angle light can be calculated and then subsequently subtracted from the overall slit angle to produce a result (which is effectively a ring with an inner diameter of z and an outer one of w).

The following equations show this:

$$\theta_z = \tan^{-1}\left(\frac{w+z}{l}\right) \tag{2}$$

$$A_z = \frac{\pi}{4}[w^2 - z^2] \tag{3}$$

where $\theta_z$ is the angle in question. If $\theta_z$ is plotted against $A_z$ for an aperture of diameter=2 mm and a length of 10 mm and normalise the result, the graph illustrated in FIG. 11 is obtained.

As can be seen, for a system such as this, incident light at less than about 11.5° will be accepted at its full intensity, which will decrease at higher angles, dropping to zero at about 22°.

From this, it is possible to determine the maximum angle of light that can be accepted by the system and when the efficiency of the system begins to decrease.

Incident Angle

In general, reflection of incident rays decreases slightly with increased incident angle until the Brewster angle is reached (~44-54°, after which point reflection increases sharply. However, this is a gross simplification for semi-transparent materials such as BOPP films or pigment filled inks used in film coatings. In reality, such materials have many optical surfaces below the top physical one.

The presence of embedded materials such as pigments which often have substantially different absorbent and reflective properties will cause a material to have substantially different reflective properties across a series of angles.

The angle of incidence to be used for the gloss measurement can be determined by considering the theoretical reflectivity of a surface for the s and p polarisation states:

$$R_s = \left[\frac{\sin(\theta_t - \theta_i)}{\sin(\theta_t + \theta_i)}\right]^2 = \left[\frac{n_1\cos(\theta_i) - n_2\cos(\theta_t)}{n_1\cos(\theta_i) + n_2\cos(\theta_t)}\right]^2 \tag{4}$$

$$R_p = \left[\frac{\tan(\theta_t - \theta_i)}{\tan(\theta_t + \theta_i)}\right]^2 = \left[\frac{n_1\cos(\theta_t) - n_2\cos(\theta_i)}{n_1\cos(\theta_t) + n_2\cos(\theta_i)}\right]^2 \tag{5}$$

Where $\theta_i$=incident angle, $\theta_t$=transmitted angle, $n_1$ and $n_2$=refractive index of media 1 and media 2 respectively.

For a randomly polarised material, the s and p reflections are averaged together to obtain a theoretical reflectivity for a typical light source. The graph illustrated in FIG. 12 illustrates a theoretical reflectivity of a hypothetical polypropylene surface with a refractive index of 1.49.

As can be seen from FIG. 12, the s polarisation state dominates the lower angles, with the p state reflecting very poorly until the Brewster angle ($\tan^{-1}(n_1/n_2)$=56.3°) is exceeded. The use of a non-polarised light source avoids the potential failure of the process at the Brewster angle, where the signal will be zero.

In experiments to determine the viability of the reflectance measuring apparatus of the authentication apparatus, the angles used were about 45° to about 60°. Using such angles, the reflectivity was between about 5% and about 9%.

As noted above, the reflectivity of the printed areas will be more complex due to the presence of pigmented material under the surface. Firstly, if the surface of the printed area is as flat as the non-printed area, then the overall reflectance could be calculated using equations (4) and (5) but with an additional value that takes into account the reflectivity of pigments under the surface of the ink. As pigments are generally small and well dispersed, this is taken to be a reasonable assumption.

Pigments are designed to absorb parts of the electromagnetic spectrum and reflect others. An ideal pigment will reflect as much light as it can whilst still maintaining its target colour—otherwise it will be quite dull. Conveniently, for the process performed by the apparatus of one or more embodiments of the present invention, both pigments in general and especially banknote pigments are dull. Coupled with this, pigments reflect light in all directions (otherwise it would not be possible to see them unless they are viewed at an angle equal to the incident angle of the ambient light in the environment). This means that, at any one angle, only a portion of the reflected light is seen. Add these two factors together and it means that a great deal of difference between the reflectivities of the printed and unprinted areas would not be expected, except at low angles)(<30° where pigment reflection will make the printed areas reflect more and at angles greater than the Brewster angle, when top surface (and bottom surface in the case of unprinted film) reflections are expected to dominate over pigment reflections making the unprinted areas more reflective.

In an experiment to measure gloss using the reflectance measuring apparatus forming part of the authentication apparatus according to one or more embodiments of the present invention, an Australian $50 banknote was passed through the measuring region of the reflectance measuring apparatus to mimic a banknote sorting system.

FIG. 13 illustrates the intensity profile detected when the Australian $50 banknote is passed through the reflectance measuring apparatus forming part of the authentication apparatus according to one or more embodiments of the present invention.

In the figure, the straight line X illustrates where the apparatus scanned the banknote, and the other line Y illustrates the voltage signal output by the second detector of the reflectance measuring apparatus.

The pigmented regions of the note reflect more (although not much more) than the window region Z, and are not affected much by the colour of the note (although the colours on this particular note are relatively plain). This experiment was conducted at an angle 60°, where a 9% reflectivity from the film would be expected. If the angle is reduced, then the importance of the pigment in the reflection will increase and vice versa.

It is clear from the graph that the edge of the note can be detected (i.e. the steep increase of the curve (denoted by $Y_1$) at the right-hand side of the figure). Also, the window region Z of the note can be detected—note the decrease in the voltage profile (denoted by $Y_2$) which is coincident with the location of the window region Z.

Second Detector "Stand-Off" Distance/Divergence/Second Detector Signal

Light from most sources is highly divergent (the exceptions being laser light and starlight) and therefore any ideal incident ray/reflected ray models quickly break up with increased distance of the second detector from the point of reflection. The centre of any divergent light source will still contain the ideal rays, but the greater the distance of the second detector from the point of reflection, the less intense the received reflected rays will be.

Therefore, it will be appreciated that increased divergence of illuminating rays and/or increased distance of the second detector from the point of reflection will decrease the signal strength of the reading from the second detector because the intensity of the received reflected rays will be less.

However, if a second detector is close to a surface (and thus, the point of reflection) then it will gather light from a broader range of angles. This may lead to the second detector receiving unwanted rays and thus affect the value of the signal output by the second detector.

Reflectance measuring apparatus forming part of the authentication apparatus according to one or more embodiments of the present invention may require the second detector to collect reflected rays from precise angles.

It will be appreciated from the above, therefore, that increasing the distance between the second detector and an item surface will increase its accuracy (because the likelihood of the second detector gathering light from a broader range of angles is reduced). However, increasing the distance between the second detector and an item surface will also reduce the intensity of reflected rays received by the second detector.

Additionally, decreasing divergence of the illuminating source (i.e. the second emitter) will also increase accuracy of the reflectance measuring apparatus as the decreased divergence may result in fewer stray reflections. Therefore, in an optional arrangement, the second emitter comprises a laser light source.

Photodiodes generate a voltage that is proportional to the intensity of light that falls upon them. The intensity of light (which must not be confused with radiant intensity) can be calculated from the irradiance of a light source which is given by:

$$I_o = \frac{P\pi d^2}{4} \tag{6}$$

where $I_o$ is the irradiance (W/mm$^2$) at the light source, P is the power of the light source (W) and d is the diameter of the light source (mm).

However, it is the irradiance at the second detector rather than the source (i.e. the second emitter) that is of interest. To establish this, the path length between the light source and the second detector (collectively the "probes") must be calculated. The relationship between path length, $l_{path}$, and stand-off distance, $z_{probe}$, is as follows:

$$l_{path} = \frac{2z_{probe}}{\cos\theta_{probe}} \tag{7}$$

where $\theta_{probe}$ is the angle at which the light source and the second detector are set relative to the surface (the angle between the two will be double this). This distance is the distance between light source and second detector.

The diameter of the beam at the second detector (e.g. photodiode), $d_{photo}$, can be calculated by the following:

$$d_{photo} = d + 2l_{path} \tan\theta_{div} \tag{8}$$

where d is the diameter of the light source and $\theta_{div}$ is the divergence of the light source (which will be quoted as part of the technical specification of the light source).

The intensity at the second detector can then be calculated as:

$$I_{div} = \frac{P\pi d_{photo}^2}{4} = \frac{P\pi(d + 2l_{path}\tan\theta_{div})}{4} \quad (9)$$

The intensity drop between source and second detector can therefore be calculated by:

$$\text{Intensity Drop} = \frac{I_{div}}{I_o} = \frac{d_{photo}^2}{d^2} \quad (10)$$

Any calculation of stand-off distance must therefore take into account the drop off in intensity from the light source to the second detector which is a product of the angles involved and the path lengths of the light. The limits of this will be determined by the light source intensity, the second detector sensitivity and the ambient light noise levels.

The light emitted by the light source has three separate conditions with respect to the second detector:
- If $d_{photo}$ > w, then the second detector is too far from the measuring region and useful low angle light is being lost.
- If $d_{photo}$ = w, then the second detector is at the correct distance from the measuring region.
- If $d_{photo}$ < w, then the second detector is too close to the measuring region and higher angle light than the second detector is designed to accept can find its way into the second detector.

Equations (7) and (8) can be rearranged to give equations (11) and (12) which show how the optimal stand-off distance, $z_{probe}$, can be calculated for a divergence angle and a device angle (11); and how the optimal device angle can be calculated for a stand-off distance and divergence angle (12):

$$z_{probe} = \frac{(w - d)\cos\theta_{probe}}{4\tan\theta_{div}} \quad (11)$$

$$\theta_{probe} = \cos^{-1}\left(\frac{4z_{probe}\tan\theta_{div}}{(w - d)}\right) \quad (12)$$

From (11), it may be appreciated that, the lower the light source divergence, the further the possible stand-off distance.

Resolution of the Edge Detection

Another consideration with the reflectance measuring apparatus forming part of the authentication apparatus according to one or more embodiments of the present invention may be the accuracy of the edge detection, which is a function of the size of w, i.e. the size of entrance aperture/tube diameter. In practice, the resolution of detection will be slightly smaller than the aperture size as the reflected light will diverge as it travels from the film to the aperture.

First, the path length must be calculated. This uses a similar equation to that shown in equation (7). However, this path length is from the surface of the film only and from the aperture to the film instead of from the film to the detector:

$$l_{reflected} = \frac{z_{aperture}}{\cos\theta_{probe}} \quad (13)$$

where $l_{reflected}$ is the reflected path length and $z_{aperture}$ is the distance between the film surface and the aperture.

From this, it is possible to calculate the width of the ray, $d_{res}$ that would be accepted by an aperture of $d_{aperture}$ width and over a path length of $l_{ref}$. The method is the reverse of equation (8), substituting in the new widths and path lengths that describe the reflected light:

$$d_{res} = d_{aperture} - 2l_{ref}\tan\theta_{div} \quad (14)$$

The resolution would therefore be greater than the aperture—which could be considered as the minimum resolution of the system.

Wavelength

Wavelength of the illuminating rays may alter the behaviour of reflections with respect to surface roughening (i.e. altered interference).

In an optional arrangement, an IR emitter is used. This may improve accuracy of the apparatus because the second detector in such an arrangement is IR ray sensitive and so may be unaffected by interference from ambient light sources. However, in other optional arrangements, second emitters operative to emit electromagnetic radiation from other parts of the electromagnetic spectrum may be suitable. In such cases, the second detector may be protected from stray rays by, for example, a shade.

Item or Bank Note Angle

Although in the ideal situation, the angle of the item or banknote to the second detector will always be the same, in reality this will not always be the case. For example, the banknote may contain creases, or draughts may cause "flutter" of the note in the measuring region. Variations in note to second detector angle will alter the angle of the desired reflection. To counter this, the angular range of second detector acceptance can be increased (through shortening the set-back distance). However, this may decrease the accuracy of the device, so a suitable balance between these conflicting parameters will need to be achieved.

The variance in the reflectivity angle caused by the above-described example phenomena may be plus or minus a few degrees. Such a variance could be accounted for in an optional arrangement by employing an interpretation module in the apparatus to effectively remove second detector readings caused due to variance in reflectivity angle.

FIG. 14 schematically illustrates a top view of an emitter-detector-item arrangement of the reflectance measuring apparatus for use in an optional arrangement of the authentication apparatus of one or more embodiments of the present invention. To aid clarity, a birefringence measurement apparatus of the authentication apparatus is not shown.

The reflectance measuring apparatus 300 comprises a second emitter 302, second detector 304, processing means 306 electronically coupled to second detector 304 by signal line 308, and a shade 310 associated with the second emitter 302 and second detector 304. The shade 310 will be described in more detail later.

The reflectance measuring apparatus 300 is configured such that the second emitter 302 and second detector 304 are oriented to face a measuring region 311. Second emitter 302 is operative to illuminate the measuring region 311 with electromagnetic radiation (denoted by dotted arrow IL in the figure), and second detector 304 is oriented and operative to receive electromagnetic radiation (denoted by dotted arrow RL in the figure) reflected from a portion of an item located in the measuring region 311.

Optionally, the authentication apparatus may comprise a path along which an item may be conveyed. The measuring region 311 forms part of this path. Thus, in this particular arrangement, the item may be conveyed along the path from one side of the authentication apparatus to the other and, during its transit, pass through the measuring region 311.

In the illustrated arrangement, the item comprises a banknote 312.

The shade 310 in the illustrated arrangement comprises a main body element in which are provided a second emitter tube 314a and a second detector tube 314b. The second emitter 302 is located at, or near, one end of second emitter tube 314a on a first side of the shade 310. The second detector 304 is located at, or near, one end of second detector tube 314b on the first side of the shade 310. Illuminating electromagnetic radiation IL emitted by second emitter 302 travels through second emitter tube 314a and emerges from the second emitter tube 314a at a mouth portion thereof. The mouth portion is located on a second side of the shade 310. Second detector tube 314b is located and oriented within the shade 310 relative to the second emitter tube 314a and measuring region 311 such that reflected electromagnetic radiation RL reflected from the measuring region 311 enters second detector tube 314b at a mouth portion thereof. The mouth portion of the second detector tube 314b is located on a second side of the shade 310. After entering the second detector tube 314b via mouth portion, the reflected electromagnetic radiation RL travels along second detector tube 314b to second detector 304.

In operation, the banknote 312 will be conveyed along the path in a direction from the left-hand side to the right-hand side of the figure (i.e. as indicated by arrow C). The instance illustrated in FIG. 14 shows the banknote 312 with a portion thereof located in the measuring region 311. Illuminating electromagnetic radiation IL from second emitter 302 passes through second emitter tube 314a and exits the second emitter tube 314a from the mouth portion thereon. After exiting the second emitter tube 314a, the illuminating electromagnetic radiation IL is incident upon the portion of the banknote 312 located in the measuring region 311. At least a portion of the incident illuminating electromagnetic radiation IL will be reflected by the banknote 312. This reflected electromagnetic radiation RL is reflected toward mouth portion of second detector tube 314b, from where it enters second detector tube 314b and continues thereafter to second detector 304. The second detector 304, responsive to detection of reflected electromagnetic radiation RL incident thereon, outputs a signal proportional to the intensity of received reflected electromagnetic radiation RL via signal line 308 to processing means 306.

Processing means 306, upon receiving an output signal from the second detector 304, is operative to compare a value of the received signal with a set of pre-defined values stored in a database (not shown). These pre-defined values may correspond to expected reflected electromagnetic radiation values when one or more of: a printed region of a banknote is located in the measuring region 311; an unprinted region of a banknote (e.g. a window region) is located in the measuring region 311; no banknote is located in the measuring region 311. The processing means may use this signal, in conjunction with a signal received from the birefringence measuring apparatus (not shown) to output a signal indicative of whether or not the banknote is authentic or not.

As the banknote 312 continues its passage through the reflectance measuring apparatus 300, the processing means 306 receives a number of readings from the second detector 304. Optionally, the birefringence measuring apparatus performs its measurement only when a window region is located in the measuring region 311 (i.e. the operation of the birefringence measurement may be based on the signal output by the reflectance measuring apparatus).

This apparatus 300 may form part of an authentication apparatus implemented in, for example, a banknote counting system. The processing means 306 may be operative to output a signal to a counting device only when a genuine banknote passes through the authentication apparatus.

In optional arrangement, the shade 310 may comprise an injection moulded part (optionally a single injection moulded part) which, further optionally, comprises an absorbent black pigmented polymer such as, for example, polyethylene, nylon or polypropylene.

The second emitter 302 may optionally comprise an LED and/or a laser of a number of different wavelengths. Optionally, the wavelength of the illuminating electromagnetic radiation IL may be in the IR region of the electromagnetic spectrum, e.g. about 890 nm.

The second detector 304 may optionally comprise a photodiode configured to provide a broad spectrum second detector (e.g. operative to detect reflected rays having wavelengths in the range of about 400 nm to about 1140 nm). In a particular optional arrangement, the second detector may be operative to detect reflected rays having wavelengths in the range of about 880 nm to about 1140 nm.

FIG. 15 schematically illustrates a top view of an emitter-detector-item arrangement of the reflectance measuring apparatus for use in an optional arrangement of the authentication apparatus of one or more embodiments of the present invention. Again, to aid clarity, a birefringence measurement apparatus of the authentication apparatus is not shown.

Features similar to those illustrated in FIG. 14 are also illustrated in FIG. 15. In FIG. 15, the features common with those FIG. 8 are now designated with reference numerals of the type 4XX rather than 3XX. Thus, in FIG. 15, the reflectance measuring apparatus is denoted by reference number 400 (rather than 300), the second emitter, by reference number 402 (rather than 402) and so on.

The arrangement illustrated in FIG. 15 is similar to that of FIG. 14 except for the replacement of a single second emitter and single second detector with multiple second emitters and multiple second detectors. Thus, in FIG. 15, three second emitters 402a, 402b, 402c replace the single second emitter 302 of the arrangement illustrated in FIG. 14, and three second detectors 404a, 404b, 404c replace the single second detector 304 of the arrangement illustrated in FIG. 14.

A first one of the second emitters 402a is paired with a first one of the second detectors 404a, a second one of the second emitters 402b is paired with a second one of the second detectors 404b, and a third one of the second emitters 402c is paired with a third one of the second detectors 404c.

In view of the increase in the number of second emitters and second detectors compared with the arrangement illustrated in FIG. 14, consequent modifications are also required to the shade. Thus three second emitter tubes 414a, 414a' and 414a" are provided in shade 410, along with three second detector tubes 414b, 414b', 414b".

Illuminating electromagnetic radiation IL emitted by the first one of the second emitters 402a will travel along a first one of the second emitter tubes 414a and be incident upon a portion of the banknote 412 in the measuring region 411. Reflected electromagnetic radiation RL reflected from the banknote 412 in the measuring region 411 will travel toward a mouth of a first one of the second detector tubes 414b and, upon entering the first one of the second detector tubes 414b through the mouth thereof, will travel along the first one of the second detector tubes 414b to be received by the first one of the second detectors 404a.

Similarly, illuminating electromagnetic radiation IL emitted by the second one of the second emitters 402b will travel along a second one of the second emitter tubes 414a' and be incident upon a portion of the banknote 412 in the measuring region 411. Reflected electromagnetic radiation RL reflected from the banknote 412 in the measuring region 411 will travel toward a mouth of a second one of the second detector tubes 414b' and, upon entering the second one of the second detector tubes 414b' through the mouth thereof, will travel along second one of the second detector tubes 414b' to be received by the second one of the second detectors 404b.

Further, the third one of the second emitters 402c is operative to emit light into a third one of the second emitter tubes 414a". Rays reflected from the portion of the banknote 412 in the measuring region 411 due to incidence of illuminating electromagnetic radiation IL from the third one of the second emitter tubes 414a" will travel toward a mouth of the third one of the second detector tubes 414b" and, upon entering the third one of the second detector tubes 414b" through the mouth thereof, will travel along the third one of the second detector tubes 414b" to be received by the third one of the second detectors 404c.

Thus, in the illustrated optional arrangement, the reflectance measuring apparatus 400 comprises a multiple angle point analysis apparatus.

As described above, the second emitters are matched in their aperture paths with the second detectors. Although in this instance there are three angles shown for both second emitter and second detector, more could be used in other optional arrangements if appropriate.

The second emitters 402a, 402b, 402c are oriented so that illuminating electromagnetic radiation emitted therefrom is incident on the same part of the surface of the item being detected, i.e. the same point in the measuring region. It follows that the second detectors 404a, 404b, 404c should be similarly oriented in order to receive electromagnetic radiation reflected from the same part of the surface.

The processor 406 may be operative to perform analysis of multiple output signals received from the second detectors 404a, 404b, 404c.

In another optional arrangement, reflection measurement using multiple wavelengths could be applied to single or multiple angle measurements (i.e. the apparatus illustrated in FIG. 14 or 15 could be configured to make reflection measurements over a number of different wavelengths).

Possible configurations which could be based on the same geometry as the single wavelength measurement devices may comprise:
a) Colour second emitter to second detector: a single coloured second emitter replaces the second emitter in the arrangement of FIG. 14. However, if more than one colour was to be employed at a particular angle, this may prove problematic. There may be two solutions, namely:
  i. rotating the measurement around a circle: this maintains the angle and measures the same point of the note at the same time, but risks variation due to polarisation by reflection. The differences are not likely to be extreme and, if the same measurement orientation is used every time, the results will be consistent; and
  ii. delayed signals: measurement of points in a line could be measured in a cascading sequence by rows of parallel detection systems (point 1 is measured by station 1 at time 1, point 1 is measured by station 2 at time 2 whilst point 2 is being measured by station 1, etc.)
b) A white light emitter source may be used in conjunction with one or more of:
  i. a spectrometer in place of the photodiode second detector;
  ii. the functional components of a spectrometer located in the aperture tube (i.e. diffraction grating and a CCD second detector/CMOS); and
  iii. a digital camera.

Another optional arrangement of one or more embodiments of the present invention comprises a reflectance measuring apparatus operative to perform a full area scan. Such an arrangement is illustrated in FIG. 15. In this arrangement, there is provided a reflectance measuring apparatus 500 which comprises a strip electromagnetic radiation source 502 operative to emit illuminating electromagnetic radiation IL toward a banknote 506 located in the authentication apparatus. The incident electromagnetic radiation IL may be reflected by the note as reflected electromagnetic radiation RL toward a line-scan camera 504.

In this arrangement, the mode of operation is the same as described in other arrangements above, except that the second emitter/second detector combination of the earlier described arrangement is replaced with strip electromagnetic radiation source 502 and line-scan camera 504. The banknote 506 may be moved relative to the strip electromagnetic radiation source 502 and line-scan camera 504 or vice versa. Such an arrangement may be used to obtain a full map of the surface reflectivity at a particular illumination angle by taking measurements of the value of the reflected electromagnetic radiation RL using line-scan camera 504.

This map may optionally be monochrome or coloured (i.e. reflected electromagnetic radiation RL is collected by way of a colour camera or via a diffraction grating coupled to a 2D CMOS array). Further, the map may be built up from a series of measurements obtained by illuminating the banknote over a series of angles (e.g. similar to the arrangement illustrated in FIG. 15, but with the strip electromagnetic radiation sources and line-scan cameras effectively extending into/out of the plane of the paper).

In an optional arrangement, IR light just outside the visible spectrum may be used. In a further optional arrangement, one way of potentially reducing noise would be to employ a filter to filter out white light.

In all of the above-described "non-static" arrangements, a banknote may be moved relative to the authentication apparatus (i.e. moved along a transport path through the apparatus). However, in other optional "non-static" arrangements, the banknote may be stationary and the apparatus moved relative to the banknote.

In another optional arrangement, the emitter(s) and detector(s) of the birefringence measuring apparatus may be tilted or offset so that the optical path-length through the note increases.

In the above described arrangements, the polarisers of the birefringence measuring apparatus are "crossed". That is, a first polariser 112 is arranged such that a transmission orientation thereof is about ±45° to a transmission orientation of a portion of an item 106 located in a measuring region 108. A second polariser 116 is arranged such that a transmission orientation thereof is about ±45° to the transmission orientation of the portion of the item 106 located in the measuring region 108. That is, the transmission orientation of the first polariser 112 is at about 90° to that of the second polariser 116. In an optional arrangement, the transmission orientation of the first polariser 112 to that of the second polariser 116 may be 90°. However, in other optional arrangements, the transmission orientation of the first polariser 112 to that of the second polariser 116 may be non-perpendicular. For example, the transmission orientation of the first polariser 112 to that of the second polariser 116 may be about 89°. In such "non-perpendicular" arrangements, the amount of illuminating radiation which is allowed to pass through the polarisers increases compared with the "perpendicular" arrangements. This will affect the background levels of the detector(s) and may improve the ability of the apparatus to detect edges.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods and apparatus is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as, Liberate, OCAP, MHP, Flash, HTML and associated languages, JavaScript, PHP, C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

What is claimed is:

1. An authentication apparatus operative to determine the authenticity of an item comprising a film substrate responsive to detection that a portion of said item located in a measuring region of said apparatus has a predetermined birefringence characteristic, said apparatus comprising:
    an item detection arrangement operative to determine if at least a portion of an item is located in a measuring region of said authentication apparatus;
    an optically-based birefringence measuring apparatus, and
    a control means operative to control output of said authenticity signal from said apparatus responsive to determination, by said item detection arrangement, of presence or otherwise of said at least a portion of said item in said measuring region,
    wherein said authentication apparatus is operative to compare a measured birefringence characteristic with a predetermined birefringence characteristic and to produce an authenticity signal indicative of authenticity or otherwise of said item based upon said comparison.

2. The apparatus according to claim 1, wherein said item detection arrangement comprises:
    an item detection emitter located, and operative, to illuminate with electromagnetic radiation an item detection region of said apparatus; and
    an item detection detector located, and operative, to receive at least one of: electromagnetic radiation reflected from said item detection region and electromagnetic radiation transmitted through said item detection region,
    wherein said item detection detector is further operative to provide a signal indicative of presence or otherwise of an item in said item detection region, and
    wherein said item detection arrangement is operative to determine that said at least a portion of said item is located in said measuring region responsive to receipt of said item detection detector signal indicating presence of an item in said item detection region.

3. A banknote counting apparatus comprising the authentication apparatus of claim 1, the banknote counting apparatus further comprising:
a note counting device operative to maintain a count of banknotes conveyed through the apparatus,
wherein said note counting device is further operative to receive the authenticity signal indicative of authenticity or otherwise of the item from said authentication apparatus, and
wherein the note counting device is operative to alter a note count only when the signal indicates that an item in the measuring region is authentic.

4. The apparatus according to claim 1, wherein said optically-based birefringence measuring apparatus comprises:
a birefringence measurement emitter located, and operative, to illuminate said measuring region of said apparatus with electromagnetic radiation;
a first polariser located between said birefringence measurement emitter and a first side of said measuring region so that electromagnetic radiation emitted by said birefringence measurement emitter passes therethrough;
a birefringence measurement detector located on a second side of said measuring region, and operative to receive electromagnetic radiation transmitted through said measuring region from said birefringence measurement emitter; and
a second polariser located between said second side of said measuring region and said birefringence measurement detector so that electromagnetic radiation transmitted through said measuring region passes therethrough, said second polariser oriented so as to effect polarisation in a direction transverse to that of the first polarizer,
wherein said birefringence measurement detector is operative to output a signal corresponding to a measured birefringence characteristic.

5. The apparatus according to claim 4, wherein said output signal output by said birefringence measurement detector corresponding to a measured birefringence characteristic is proportional to an intensity of transmitted electromagnetic radiation received.

6. The apparatus according to claim 4, wherein said birefringence measurement detector is operative to communicate said output signal corresponding to a measured birefringence characteristic to a processor which is operative to compare a value of said output signal with said predetermined birefringence characteristic.

7. The apparatus according to claim 4, wherein said predetermined birefringence characteristic comprises one of:
a first range of values corresponding to expected birefringence measurement detector output signal values if an opaque or semi-opaque region of said item is located in said measuring region;
a second range of values corresponding to expected birefringence measurement detector output signal values if a transparent or semi-transparent region of said item is located in said measuring region; and
a third range of values corresponding to expected birefringence measurement detector output signal values if no item is present in said measuring region.

8. The apparatus according to claim 1, wherein said item detection arrangement comprises an optically-based reflectance measuring apparatus for determining if an item authentication region is located in said measuring region,
wherein said reflectance measuring apparatus comprises:
a reflectance measurement emitter operative to illuminate said measuring region of said apparatus with electromagnetic radiation; and
a reflectance measurement detector located and operative to receive electromagnetic radiation reflected from said measuring region of said apparatus and operative to output a signal corresponding to a measured characteristic of said electromagnetic radiation reflected from said measuring region and indicative of presence or otherwise of an item authentication region in said measuring region, and
wherein said reflectance measuring apparatus is operative to:
compare a measured reflection characteristic with a set of predetermined reflection characteristics and to determine presence or otherwise of said item authentication region in said measuring region based upon said comparison; and
provide to said control means a signal indicative of said determination for controlling output of said authenticity signal from said control means.

9. The apparatus according to claim 8, wherein said output signal output by said reflectance measurement detector corresponding to a measured reflection characteristic is proportional to an intensity of reflected electromagnetic radiation received.

10. The apparatus according to claim 8, wherein said reflectance measurement detector is operative to communicate said output signal corresponding to a measured reflection characteristic to a processor,
wherein said processor is operative to compare a value of said output signal corresponding to said measured reflection characteristic with said predetermined reflection characteristic, said predetermined reflection characteristic comprising a pre-defined value indicative of presence of an item authentication region of said item in said measuring region, and
wherein said processor is operative to implement said determination that said item authentic region is present or absent in said measuring region based upon said comparison and is operative to provide to said control means said signal indicative of said determination.

11. The apparatus according to claim 10, wherein if said comparison of said predetermined reflection characteristic with said output signal output by said reflectance measurement detector corresponding to a measured reflection characteristic indicates that said item authentication region is located in the measuring region, said processor is operative to output a determination signal to said control means indicative of presence of said item authentication region in said measuring region, and
wherein responsive to receipt thereof, said control means is operative to output said authenticity signal indicative of authenticity or otherwise of said item based upon said comparison of said predetermined birefringence characteristic with said output signal output by said birefringence measurement detector corresponding to a measured birefringence characteristic.

12. The apparatus according to claim 11, wherein said predetermined reflection characteristic comprises one or more of:

a first range of values corresponding to expected reflectance measurement detector output signal values if an opaque or semi-opaque region of said item is located in said measuring region;

a second range of values corresponding to expected reflectance measurement detector output signal values if a transparent or semi-transparent region of said item is located in said measuring region; and a third range of values corresponding to expected reflectance measurement detector output signal values if no item is present in said measuring region.

13. The apparatus according to claim 10, wherein the reflectance measurement detector has associated therewith a shade, said shade including at least one aperture, wherein said aperture is located with respect to the reflectance measurement detector to permit electromagnetic radiation reflected from said at least a portion of said item to be received by the reflectance measurement detector.

14. The apparatus according to claim 10, wherein said reflectance measurement emitter has associated therewith a shade, said shade including an aperture, and wherein said aperture is located with respect to the reflectance measurement emitter to permit electromagnetic radiation emitted from the reflectance measurement emitter to be directed toward the measuring region of said apparatus.

15. The apparatus according to claim 10, wherein said reflectance measurement emitter comprises at least one of:

a plurality of LEDs;

a plurality of white light emitter sources; and a plurality of strip electromagnetic radiation sources, wherein said reflectance measurement detector comprises at least one of:

a plurality of photodiodes;

a plurality of line-scan cameras; and a plurality of spectrometers and CCD or CMOS image sensors, wherein each one of said plurality of LEDs is paired with a corresponding one of said plurality of photodiodes and/or said plurality of line-scan cameras and/or said plurality of spectrometers and CCD or CMOS image sensors, wherein each one of said plurality of white light emitter sources is paired with a corresponding one of said plurality of photodiodes and/or said plurality of line-scan cameras and/or said plurality of spectrometers and CCD or CMOS image sensors, and wherein each one of said plurality of strip electromagnetic radiation sources is paired with a corresponding one of said plurality of said photodiodes and/or said plurality of line-scan cameras and/or said plurality of spectrometers and CCD or CMOS image sensors.

16. A method of authenticating an item comprising a film substrate, the method comprising:

detecting if a portion of an item located in a measuring region of an authentication apparatus has a predetermined birefringence characteristic;

determining, by an item detection arrangement, if at least a portion of an item is located in a measuring region of said authentication apparatus;

comparing a measured birefringence characteristic, obtained by an optically-based birefringence measuring apparatus, with a predetermined birefringence characteristic;

producing an authenticity signal indicative of authenticity or otherwise of said item based upon said comparison; and controlling, by way of a control means, output of said authenticity signal from said apparatus responsive to determination, by said item detection arrangement, of presence or otherwise of said at least a portion of said item in said measuring region.

17. The method according to claim 16, comprising:

illuminating with electromagnetic radiation, by way of an item detection emitter forming part of said item detection arrangement, an item detection region of said apparatus;

receiving, by way of an item detection detector forming part of said item detection arrangement, at least one of: electromagnetic radiation reflected from said item detection region and electromagnetic radiation transmitted through said item detection region;

providing a signal indicative of presence or otherwise of an item in said item detection region and, responsive to receipt of an item detection detector signal indicating presence of an item in said item detection region; and determining, by said item detector arrangement, that said at least a portion of said item is located in said measuring region.

18. The method according to claim 16, comprising:

illuminating, with a birefringence measurement emitter, said measuring region of said apparatus with electromagnetic radiation;

locating a first polariser between said birefringence measurement emitter and a first side of said measuring region so that electromagnetic radiation emitted by said birefringence measurement emitter passes therethrough;

locating a birefringence measurement detector on a second side of said measuring region;

receiving, at said birefringence measurement detector, electromagnetic radiation transmitted through said measuring region from said birefringence measurement emitter;

locating a second polariser between said second side of said measuring region and said birefringence measurement detector so that electromagnetic radiation transmitted through said measuring region passes therethrough;

orienting said second polariser so as to effect polarisation in a direction transverse to that of the first polariser; and outputting, from said birefringence measurement detector, a signal corresponding to a measured birefringence characteristic.

19. The method according to claim 16, comprising:

determining, by way on an optically-based reflectance measuring apparatus of said item detection arrangement, if an item authentication region of an item is located in said measuring region, said determining step implemented by:

illuminating, by way of a reflectance measurement emitter of said reflectance measuring apparatus, said measuring region of said apparatus with electromagnetic radiation;

receiving, by way of a reflectance measurement detector of said reflectance measuring apparatus, electromagnetic radiation reflected from said measuring region of said apparatus;

outputting, from said reflectance measurement detector, a signal corresponding to a measured characteristic of said electromagnetic radiation reflected from said measuring region and indicative of presence or otherwise of an item authentication region in said measuring region;

comparing, in said reflectance measuring apparatus, a measured reflection characteristic with a set of predetermined reflection characteristics;

determining presence or otherwise of said item authentication region in said measuring region based upon said comparison; and providing, to said control means, a signal indicative of said determination for controlling output of said authenticity signal from said control means.

20. A banknote counting method comprising the method of claim 16, the banknote counting method further comprising:

maintaining, using a note counting device, a count of banknotes conveyed through the apparatus;

receiving, at the note counting device, from the authentication apparatus, said authenticity signal indicative of authenticity or otherwise of said item; and altering a note count only when the authenticity signal indicates that an item in the measuring region is authentic.

\* \* \* \* \*